US012811329B2

(12) United States Patent
Droesbeke

(10) Patent No.: US 12,811,329 B2
(45) Date of Patent: Nov. 24, 2026

(54) CONNECTOR ASSEMBLY

(71) Applicant: Aptiv Technologies AG, Schaffhausen (CH)

(72) Inventor: Gert Droesbeke, Erkrath (DE)

(73) Assignee: Aptiv Technologies AG, Schaffhausen (CH)

( * ) Notice: Subject to any disclaimer, the term of this patent is extended or adjusted under 35 U.S.C. 154(b) by 424 days.

(21) Appl. No.: 18/394,028

(22) Filed: Dec. 22, 2023

(65) Prior Publication Data

US 2024/0213702 A1 Jun. 27, 2024

(30) Foreign Application Priority Data

Dec. 23, 2022 (EP) .................................... 22216395

(51) Int. Cl.

*H01R 13/40* (2006.01)
*H01R 13/646* (2011.01)
*H01R 13/6581* (2011.01)
*H01R 43/02* (2006.01)
*H01R 13/639* (2006.01)
*H01R 103/00* (2006.01)

(52) U.S. Cl.

CPC ........... *H01R 13/40* (2013.01); *H01R 13/646* (2013.01); *H01R 13/6581* (2013.01); *H01R 43/02* (2013.01); *H01R 13/639* (2013.01); *H01R 2103/00* (2013.01)

(58) Field of Classification Search

CPC .. H01R 13/40; H01R 13/646; H01R 13/6581; H01R 43/02; H01R 13/639; H01R 2103/00; H01R 43/0221; H01R 13/10; H01R 13/65914; H01R 4/027; H01R 4/029; H01R 13/506; H01R 43/0263; H01R 4/023; H01R 13/02; H01R 43/20

See application file for complete search history.

(56) References Cited

U.S. PATENT DOCUMENTS 3,122,408 A 2/1964 Jojne
4,007,977 A 2/1977 Bauerle
4,634,201 A 1/1987 Kemka
6,039,614 A 3/2000 Ramari
11,411,352 B2 * 8/2022 Droesbeke ........... H01R 13/516

(Continued)

FOREIGN PATENT DOCUMENTS

CN 208508037 U 2/2019
CN 112290244 A 1/2021

(Continued)

OTHER PUBLICATIONS

Extended European Search Report for Application No. 21213495.1; European Patent Office; mailed May 30, 2022; 5 pages.

(Continued)

*Primary Examiner* — Abdullah A Riyami
*Assistant Examiner* — Nader J Alhawamdeh
(74) *Attorney, Agent, or Firm* — Billion & Armitage

(57) ABSTRACT

A connector assembly includes at least one elongated inner signal contact which has a tube-like connection portion defining an axial direction and comprising a first welding opening. The connector assembly further includes an insulating element defining at least one elongated cavity designed to accommodate the at least one elongated inner signal contact.

21 Claims, 38 Drawing Sheets

(56) References Cited

U.S. PATENT DOCUMENTS

| | | | | |
|---|---|---|---|---|
| 12,100,915 | B2 * | 9/2024 | Droesbeke | H01R 43/0221 |
| 12,322,894 | B2 * | 6/2025 | Droesbeke | H01R 13/422 |
| 2011/0222583 | A1 | 9/2011 | Boghun et al. | |
| 2014/0148062 | A1 | 5/2014 | Mott et al. | |
| 2018/0233870 | A1 | 8/2018 | Schlipf | |
| 2021/0057854 | A1 | 2/2021 | Droesbeke | |
| 2021/0066856 | A1 * | 3/2021 | Droesbeke | H01R 13/6593 |
| 2023/0198184 | A1 | 6/2023 | Lai et al. | |
| 2024/0195114 | A1 * | 6/2024 | Faron | H01R 13/193 |
| 2024/0213702 | A1 * | 6/2024 | Droesbeke | H01R 13/506 |
| 2024/0380155 | A1 * | 11/2024 | Siwek | H01R 13/514 |
| 2025/0062564 | A1 * | 2/2025 | Droesbeke | H01R 43/20 |
| 2026/0045710 | A1 * | 2/2026 | Droesbeke | H01R 9/0518 |

FOREIGN PATENT DOCUMENTS

| | | | |
|---|---|---|---|
| CN | 215645123 | U | 1/2022 |
| DE | 2526407 | B1 | 9/1976 |
| DE | 8518567 | U1 | 8/1985 |
| DE | 102013010981 | B3 | 8/2014 |
| DE | 102016105227 | A1 | 9/2017 |
| EP | 3783754 | A1 | 2/2021 |
| FR | 2270694 | A1 | 12/1975 |

OTHER PUBLICATIONS

"Extended European Search for Application No. 22216395.8"; European Patent Office mailed on Jun. 12, 2023, 5 Pages.

"Extended European Search Report" for Application No. 23219341.7; European Patent Office; mailed Jan. 7, 2024; 38 pages.

"Extended European Search Report"; European Patent Office; mailed on May 30, 2022; 5 Pages.

"Extended European Search Report"; European Patent Office; Mailed on Jun. 12, 2023; 5 Pages.

"Extended European Search Report for Application No. 23219341.7"; European Patent Office; mailed on Jul. 1, 2024; 38 Pages.

* cited by examiner

CONNECTOR ASSEMBLY

CROSS-REFERENCE TO RELATED APPLICATION

This application claims the benefit of and priority to European Patent Application No. 22216395.8 titled “Connector Assembly” filed on Dec. 23, 2022, the contents of which are incorporated by reference herein.

TECHNICAL FIELD OF THE INVENTION

The present disclosure relates to a connector assembly, preferably for multi GHz applications. In particular, the disclosure relates to a high speed data connector assembly such as an H-MTD® (High Speed Modular Twisted-Pair-Data) connector assembly (H-MTD® is a registered trademark of Rosenberger Hochfrequenztechnik GmbH & Co).

BACKGROUND

Applications for the H-MTD® system are 4K camera systems, autonomous driving, radar, lidar, high-resolution displays and rear seat entertainment. Connectors of said system are meant to allow data transmission up to 15 GHz or 20 Gbps while having a small package size.

In such high-speed applications, every tenth of a millimeter of the interconnection channel and of the signal connectors should be within a certain data transmission (differential) impedance bandwidth (typical 100+/−5Ω) and should be matched to preceding and succeeding sections. To this end, in each of these sections, metal portions of an inner contact or signal contact and an outer contact or shielding, insulating material of an insulating element and any air gaps must be balanced in size and position with respect to each other. However, there is also a need for these components to meet other non-signal-integrity requirements, in particular mechanical requirements. For example, it has to be ensured that a male signal contact is always correctly guided into a corresponding female signal contact. Also, it has to be ensured that conductors of a cable are correctly connected to the signal contacts of the connector. To achieve high data transmission, an optimum electrical and mechanical connection between a male signal contact and a female signal contact of the connector and a secure connection between the female signal contact and the conductor of the cable is indispensable.

Accordingly, there is a need to provide a connector assembly of the high speed data kind that enables a more accurate connection between male and female signal contacts and a more secure connection between the female signal contacts and the conductors of the cable.

SUMMARY

In one aspect, the present disclosure is directed at a connector assembly, wherein the connector assembly comprises at least one elongated inner signal contact and an insulating element. The at least one elongated inner signal contact has a tube-like connection portion defining an axial direction and comprising a first welding opening. The insulating element defines at least one elongated cavity designed to accommodate the at least one elongated inner signal contact.

The connector assembly may be configured for high speed data transmission. In particular, the connector assembly may be a high speed data cable assembly such as of the H-MTD® type comprising pre-assembled signal contacts (in other words: terminals) for automotive applications.

The insulating element may comprise at least one second welding opening which is aligned with the first welding opening in an assembled state of the connector assembly.

The connector assembly described herein may be a female connector assembly, i.e., the inner signal contact is a female signal contact. In this case, the inner signal contact has a mating section comprising a funnel-shaped end section allowing for pin movement, i.e., allowing insertion of a male signal contact pin. However, it is to be understood that the connector assembly may also be a male connector assembly in which the inner signal contact is a male signal contact, i.e., the mating section of the inner signal contact may be designed as a male pin.

The inner signal contact is embedded in the insulating element. The insulting element may be formed integrally, i.e., the insulating element may be a one-piece element. Alternatively, the insulating element may form a multi-part housing, in particular a two-part housing. More specifically, the insulating element may include a first insulting part and a second insulating element, wherein each of the first insulating element and the second insulating element of the insulating element may define a cavity having a first cavity portion which receives a tube-like main section of the inner signal contact, and a second cavity portion which receives a funnel-shaped end section of the inner signal contact. The first insulating element of the insulating element may define a third cavity portion which receives the tube-like connection portion of the elongated inner signal contact. Also, the second insulating element of the insulating element may define a third cavity portion which receives the tube-like connection portion of the elongated inner signal contact. The first insulating element and the second insulating element of the insulating element together may surround the at least one inner signal contact. The terms “first” and “second” are only used to differentiate the two insulating parts. There is no restriction to features concerning the first insulating element or the second insulating element, i.e., all features of the first insulating element may also be features of the second insulating element. A cross-sectional dimension of the first cavity portion, also referred to as a minimum cross-sectional dimension of the cavity, and an outer cross-sectional dimension of the tube-like main section may be substantially equal, i.e., the tube-like main section may be embedded in the first cavity portion with marginal clearance between the tube-like main section and the insulating material defining the first cavity portion.

Since the inner signal contact expands or flares in a direction away from the tube-like main section to form the funnel-shaped end section, a maximum outer cross-sectional dimension of the funnel-shaped end section is greater than the outer cross-sectional dimension of the tube-like main section. Consequently, the maximum outer cross-sectional dimension of the funnel-shaped end section is also greater than the cross-sectional dimension of the first cavity portion, i.e., the minimum cross-sectional dimension of the cavity, thereby making it generally impossible for the inner signal contact to be pushed along the length of the cavity.

It is to be understood that in order to be able to accommodate the funnel-shaped end section of the inner signal contact, the cross-sectional dimension of the second cavity portion, also referred to as a maximum cross-sectional dimension of the cavity, must at least correspond to the maximum outer cross-sectional dimension of the funnel-shaped end section and as such is also greater than the minimum cross-sectional dimension of the cavity.

The tube-like connection portion of the elongated inner signal contact may be an axial extension of the tube-like main section of the elongated inner signal contact in a direction opposite to the funnel-shaped end section of the inner signal contact. The axial direction may be defined as an axis extending from the funnel-shaped end section over the first cavity portion to the tube-like connection portion. The first welding opening of the inner signal contact may be a hole in an outer surface of the tube-like connection portion. The first welding opening may be configured to allow access to the interior of the tube-like connection portion of the inner signal contact, for example, to allow laser welding of a conductor inserted into the tube-like connection portion of the elongated inner signal contact to the inner signal contact.

The insulating element, in particular the first insulating element and/or the second insulating element of the insulating element, may comprise at least one second welding opening. The terms "first" and "second" are only used to differentiate the welding openings of the inner signal contact and the welding openings of the insulating parts. A second welding opening of the insulating element, i.e., of the first insulating element and/or the second insulating element, may be associated with a first welding opening of the inner signal contact. Thus, each welding opening of an inner signal contact may be associated with one welding opening of the insulating element. The second welding opening of the insulating element may also be configured as a hole in an outer surface of the insulating element, in particular in an outer surface of the first insulating element and/or the second insulating element. The second welding opening may be configured to allow access to the interior of the tube-like connection portion of the inner signal contact through the first welding opening of the inner signal contact, for example, to allow laser welding of a conductor inserted into the tube-like connection portion of the elongated inner signal contact to the inner signal contact when the first welding opening and the second welding opening are aligned. An alignment of the first welding opening and the second welding opening may be reached if a center line of the first welding opening and a center line of the second welding opening are substantially coaxial, wherein the center lines may be generally perpendicular to the axial direction. In particular, this may apply to an assembled state of the connector assembly. The assembled state of the connector assembly may describe a state in which the at least one elongated inner signal contact is fully received in the first insulating element of the insulating element, and the first insulating element and the second insulating element are pinched together such that the first insulating element and the second insulating element together completely surround the at least one inner signal contact.

According to an embodiment, the at least one elongated inner signal contact may comprise a funnel-shaped reception section at one axial end of the tube-like connection portion. The funnel-shaped reception section may be arranged at an end of the at least one elongated inner signal contact opposite from the funnel-shaped end section. The elongated inner signal contact may expand or flare in a direction away from the tube-like connection portion of the inner signal contact to form the funnel-shaped reception section such that a maximum outer cross-sectional dimension of the funnel-shaped reception section is greater than an outer cross-sectional dimension of the tube-like connection portion.

According to an embodiment, the insulating element, in particular each of the first insulating element and the second insulating element of the insulating element, may comprise at least one depression configured to receive the funnel-shaped reception section of the at least one elongated inner signal contact. The at least one depression may also be funnel-shaped, in particular, corresponding to the funnel-shaped reception section of the at least one elongated signal contact. The depression may be arranged adjacent to the third cavity portion of the first insulating element and the second insulating element, respectively, as seen in the axial direction. The depression may expand or flare in a direction away from the third cavity such that a maximum outer cross-sectional dimension of the depression is greater than an outer cross-sectional dimension of the third cavity portion.

According to an embodiment, the insulating element, in particular the second insulating element of the insulating element, may have an end cap which comprises at least one funnel-shaped connection opening. The at least one funnel-shaped connection opening and the funnel-shaped reception section are aligned in an assembled state of the connector assembly. The end cap may cover the axial end of the first insulating element when the second insulating element is pinched onto the first insulating element. The funnel-shaped connection opening and the funnel-shaped reception section may be aligned in the axial direction of the inner signal contact.

According to an embodiment, the connector assembly may further comprise an outer shielding contact having at least one third welding opening, wherein the first welding opening, the at least one second welding opening and the at least one third welding opening are aligned in an assembled state of the connector assembly. The terms "first," "second" and "third" are only used to differentiate the welding openings of the inner signal contact, the insulating parts and the outer shielding contact. The third welding opening of the outer shielding contact may be associated with the first welding opening of the inner signal contact and the respective second welding opening of the second insulating element. Thus, each welding opening of an inner signal contact may be associated with one welding opening of the insulating element and one welding opening of the outer shielding contact. The third welding opening of the outer shielding contact may be configured as a hole in an outer surface of the outer shielding contact, in particular in an outer surface of a first connection end portion of the outer shielding contact. The third welding opening may be configured to allow access to the interior of the tube-like connection portion of the inner signal contact through the first welding opening of the inner signal contact and the second welding opening of the second insulating element, for example, to allow laser welding of a conductor inserted into the tube-like connection portion of the elongated inner signal contact to the inner signal contact when the first welding opening, the respective second welding opening and the respective third welding opening are aligned. An alignment of the first welding opening, the respective second welding opening and the respective third welding opening may be reached if a center line of the first welding opening, a center line of the respective second welding opening and a center line of the respective third welding opening are substantially coaxial, wherein the center lines may be generally perpendicular to the axial direction. In particular, this applies to an assembled state of the connector assembly. The assembled state of the connector assembly may describe a state where the at least one elongated inner signal contact is fully received by the first insulating element of the insulating element, the first insulating element and the second insulating element are pinched together such that the first insulating element and the second insulating element completely surrounds the at least one inner signal contact, and the outer shielding contact is fully slid onto the insulating element, i.e. onto the pinched first insulting part and the second insulating element.

According to this embodiment, the insulating element, in particular the first insulating element of the insulating element, may comprise at least one press fit spike configured to secure the insulating element to a first connection end portion of the outer shielding contact.

Accordingly, the outer shielding contact may comprise at least one gap at the first connection end portion configured to receive the at least one press fit spike.

According to an embodiment, the outer shielding contact may comprise at least one crimp wing configured to be bent over and cover the at least one third welding opening. The at least one crimp wing may be bent over and cover the at least one third welding opening after connecting the inner signal contacts to respective conductors of a cable via laser welding, ultrasonic welding or resistance welding. The at least one crimp wing may be configured to protect the at least one third welding opening after welding of environmental conditions, for example moisture. In addition, it helps to create an electromagnetic conductivity (EMC) labyrinth.

According to an embodiment, the outer shielding contact may comprise a first outer shielding contact and a second outer shielding contact, the first outer shielding contact having the at least one third welding opening and the second outer shielding contact having at least one fourth welding opening, wherein the first welding opening, the at least one second welding opening, the at least one third welding opening and the at least one fourth welding opening are aligned in an assembled state of the connector assembly. The terms "first," "second," "third," and "fourth" are only used to differentiate the welding openings of the inner signal contact, the insulating parts, the first outer shielding contact and the second outer shielding contact. The fourth welding opening of the second outer shielding contact may be associated with the first welding opening of the inner signal contact, the respective second welding opening of the second insulating element and the respective third welding opening of the first outer shielding contact. Thus, each welding opening of an inner signal contact may be associated with one welding opening of the insulating element, one welding opening of the first outer shielding contact and one welding opening of the second outer shielding contact. The fourth welding opening of the second outer shielding contact may be configured as a hole in an outer surface of the second outer shielding contact. The fourth welding opening may be configured to allow access to an interior of the tube-like connection portion of the inner signal contact through the first welding opening of the inner signal contact, the second welding opening of the second insulating element and the third welding opening of the first outer shielding contact, for example, to allow laser welding of a conductor inserted into the tube-like connection portion of the elongated inner signal contact to the inner signal contact when the first welding opening, the respective second welding opening, the respective third welding opening and the respective fourth welding opening are aligned. An alignment of the first welding opening, the respective second welding opening, the respective third welding opening and the respective fourth welding opening may be reached if a center line of the first welding opening, a center line of the respective second welding opening, a center line of the respective third welding opening and a center line of the respective fourth welding opening are substantially coaxial, wherein the center lines may be generally perpendicular to the axial direction. In particular, this applies to the assembled state of the connector assembly. The assembled state of the connector assembly may describe a state where the at least one elongated inner signal contact is fully received by the first insulating element of the insulating element, the first insulating element and the second insulating element are pinched together such that the first insulating element and the second insulating element together completely surrounds the at least one inner signal contact, the first outer shielding contact is fully slid onto the insulating element and the second outer shielding contact is fully slid onto the first connection end portion of the first outer shielding contact.

According to an embodiment, the mating section, in particular the tube-like main section, and the tube-like connection portion of the inner signal contact may be arranged coaxially to one another. Alternatively, the tube-like connection portion and the mating section may be oriented at an angle. It is even possible that the tube-like connection portion and the mating section may extend parallel but offset to one another.

In another aspect, the present disclosure is directed at a method for assembling a connector assembly according to any one of the previous embodiments. The method comprises inserting the at least one elongated inner signal contact into the at least one elongated cavity of the insulating element; inserting a conductor of a cable into the tube-like connection portion of the at least one inner signal contact; and connecting the conductor to the at least one inner signal contact via welding through the first welding opening.

Irrespective of whether the insulating element is an integral part or made of more than one part, it may comprise at least one second welding opening. In this case, the method may comprise aligning the first welding opening with the at least one second welding opening and connecting the conductor to the at least one inner signal contact via welding through the first welding opening and the at least one second welding opening.

According to an embodiment, the method may further comprise placing the at least one elongated inner signal contact into a first insulating element of the insulating element such that the at least one elongated inner signal contact adopts a preliminary position. The method further comprises sliding, in the axial direction, the at least one elongated inner signal contact along the first insulating element into an end position, and pinching a second insulating element of the insulating element onto the first insulating element of the insulating element such that the first welding opening and the at least one second welding opening are aligned in an assembled state of the connector assembly.

Again, the conductor may then be connected to the at least one inner signal contact via welding through the first welding opening and the at least one second welding opening.

According to an embodiment, the method may further comprise sliding a first connection end portion of an outer shielding contact onto the insulating element. The outer shielding contact may have at least one third welding opening, wherein the first welding opening, the at least one second welding opening and the at least one third welding opening are aligned in an assembled state of the connector assembly.

According to an embodiment, the method may further comprise inserting a cable comprising at least one conductor into a second connection end portion of the outer shielding contact, such that the at least one conductor is inserted into the tube-like connection portion of the at least one elongated inner signal contact and crimping the second connection end portion of the outer shielding contact to the cable.

In this embodiment, the method may further comprise connecting the at least one conductor of the cable to the at least one inner signal contact via welding through the first welding opening, the at least one second welding opening and the at least one third welding opening.

In this embodiment, the method may further comprise sliding a second outer shielding contact onto the first connection end portion of a first outer shielding contact, and/or fixing the second outer shielding contact to the first outer shielding contact via welding, and/or securing the crimped second connection end portion of the first outer shielding contact via welding.

According to an alternative embodiment, the method may comprise sliding an alternative second outer shielding contact having at least one fourth welding opening onto the first connection end portion of a first outer shielding contact, and/or inserting a cable into a second connection end portion of the first outer shielding contact, wherein the cable may comprise at least one conductor which is inserted into the tube-like connection portion of the at least one elongated inner signal contact, and/or crimping the second connection end portion of the first outer shielding contact to the cable, and/or connecting the at least one conductor of the cable to the at least one inner signal contact via welding through the first welding opening, the at least one second welding opening, the at least one third welding opening and the at least one fourth welding opening, and/or securing the crimped second connection end portion of the first outer shielding contact via welding.

According to another aspect, the present disclosure is directed at a connector assembly which comprises at least one elongated inner signal contact having a first connection portion, wherein the first connection portion comprises a tube-like main section and a funnel-shaped end section; and an insulating element, wherein the insulating element defines at least one elongated cavity designed to accommodate the elongated inner signal contact, wherein a maximum outer cross-sectional dimension of the funnel-shaped end section is greater than a minimum cross-sectional dimension of the elongated cavity.

According to an embodiment, the funnel-shaped end section may comprise a first end section part and a second end section part, wherein the first end section part and the second end section part are separated by two air gaps. The air gaps may be diagonally arranged, i.e., the two air gaps are arranged opposite from each other. The first end section and the second end section of the funnel-shaped end section allow a spreading apart of the funnel-shaped end section to thereby make the insertion of a male signal contact pin easier. According to another embodiment, the funnel-shaped end section may be a machined end section or a stamped, rolled, or bent end section, in which a first end section part and a second end section part are separated by just one small slit.

According to an embodiment, the insulating element may comprise at least one front opening configured to receive the funnel-shaped end section, and two chamfers protruding into the air gaps such that the first end section part, the second end section part and the two chamfers define an inlet. In other words, the chamfers may radially protrude into the front opening. The two chamfers may be arranged diagonally to each other.

The front opening of the insulating element may be configured to receive a male signal contact, and the inlet serves to lead the male signal contact into the female inner signal contact of the connector assembly. The inlet may provide an at least approximately 360° lead-in cone to guide the male signal contact into the tube-like main section of the female inner signal contact. Thus, an incorrect connection of the signal contacts can be prevented which may occur by inserting the male signal contact past the inner signal contact. Furthermore, damage to at least one of the male signal contact, the inner signal contact and the insulating element may be avoided.

According to an embodiment, the funnel-shaped end section comprises a first end section part and a second end section part, wherein the first end section part and the second end section part are separated by two air gaps, and wherein the insulating element comprises at least one rib engaging one of the air gaps and thereby widening the funnel-shaped end section. By widening the funnel-shaped end section the size of the inlet may be maximized. The two air gaps may be arranged diagonally to each other.

According to an embodiment, the insulating element and the at least one elongated inner signal contact may comprise at least one protrusion and at least one recess, respectively, wherein the protrusion and the recess are configured to cooperate in order to at least reduce or even prevent a rotation and/or an axial movement of the at least one elongated inner signal contact relative to the insulating element. The at least one protrusion may be a blocking element that provides a forward stop and/or a backward stop for the at least one elongated inner signal contact in the insulating element. A precise rotational control and limitation of movement of the inner signal contact as well as a precise rigid back and forward stop of the inner signal contact may thus be achieved.

According to an embodiment, the insulating element may comprise a control element and the at least one elongated inner signal contact may comprise a hole receiving the control element when the connector assembly is correctly assembled. The control element may be visible in the hole of the at least one elongated inner signal contact when the at least one elongated inner signal contact reaches its correct end-position during assembling. Thus, easy visual confirmation of a correct assembly of the at least one elongated inner signal contact in the insulating element is possible.

According to an embodiment, the insulating element may comprise at least one clamping element configured to secure a wire to which the at least one elongated inner signal contact is connected.

According to an embodiment, the at least one elongated inner signal contact may comprise a termination element configured to receive a wire and the insulating element may comprise at least one retaining element configured to secure the termination element and/or the wire in the insulating element. The termination element may comprise a pair of crimping wings or any other suitable termination means.

According to another embodiment, the insulating element may comprise a first insulating element and a second insulating element, wherein the first insulating element and the second insulating element surround the at least one inner signal contact. The terms “first” and “second” are only used to differentiate the two insulation parts. There is no restriction to features concerning the first insulating element or the second insulating element, i.e., all features of the first insulating element may also be features of the second insulating element.

According to an embodiment, one of the first insulating element and the second insulating element may be configured to be radially mounted in respect of the at least one elongated inner signal contact and the respective other one of the first insulating element and the second insulating element is configured to be axially slid onto the at least one elongated inner signal contact.

According to an embodiment, the at least one elongated inner signal contact may be pinched into the first insulating element or the second insulating element.

According to an embodiment, the first insulating element or the second insulating element may comprise a press fit element configured to secure the first insulating element to the second insulating element.

According to an embodiment, the first insulating element or the second insulating element may comprise at least one locking element configured to snap fit the first insulating element and the second insulating element together and thereby secure the first insulating element to the second insulating element. The locking element may provide a passive lock and/or an active lock.

According to an embodiment, the first insulating element or the second insulating element may comprise a pin and the respective other one of the first insulating element and the second insulating element comprises a slot, wherein the slot is configured to receive the pin and the pin is deformed and secured in the slot to thereby secure the first insulating element to the second insulating element.

According to an embodiment, the first insulating element or the second insulating element may comprise a groove and the respective other one of the first insulating element and the second insulating element may comprise a tongue received in the groove.

According to an embodiment, the first insulating element or the second insulating element may comprise a locking cavity and the respective other one of the first insulating element and the second insulating element may comprise a locking protrusion received in the locking cavity.

BRIEF DESCRIPTION OF THE DRAWINGS

The present invention is now described, by way of example with reference to the accompanying drawings, in which.

DETAILED DESCRIPTION

The embodiments described below are related to a connector of the H-MTD® type. However, the invention is not limited to this type of connector but can be applicable to any high speed data connector such as coax, unshielded connector and the like.

Figure 1:
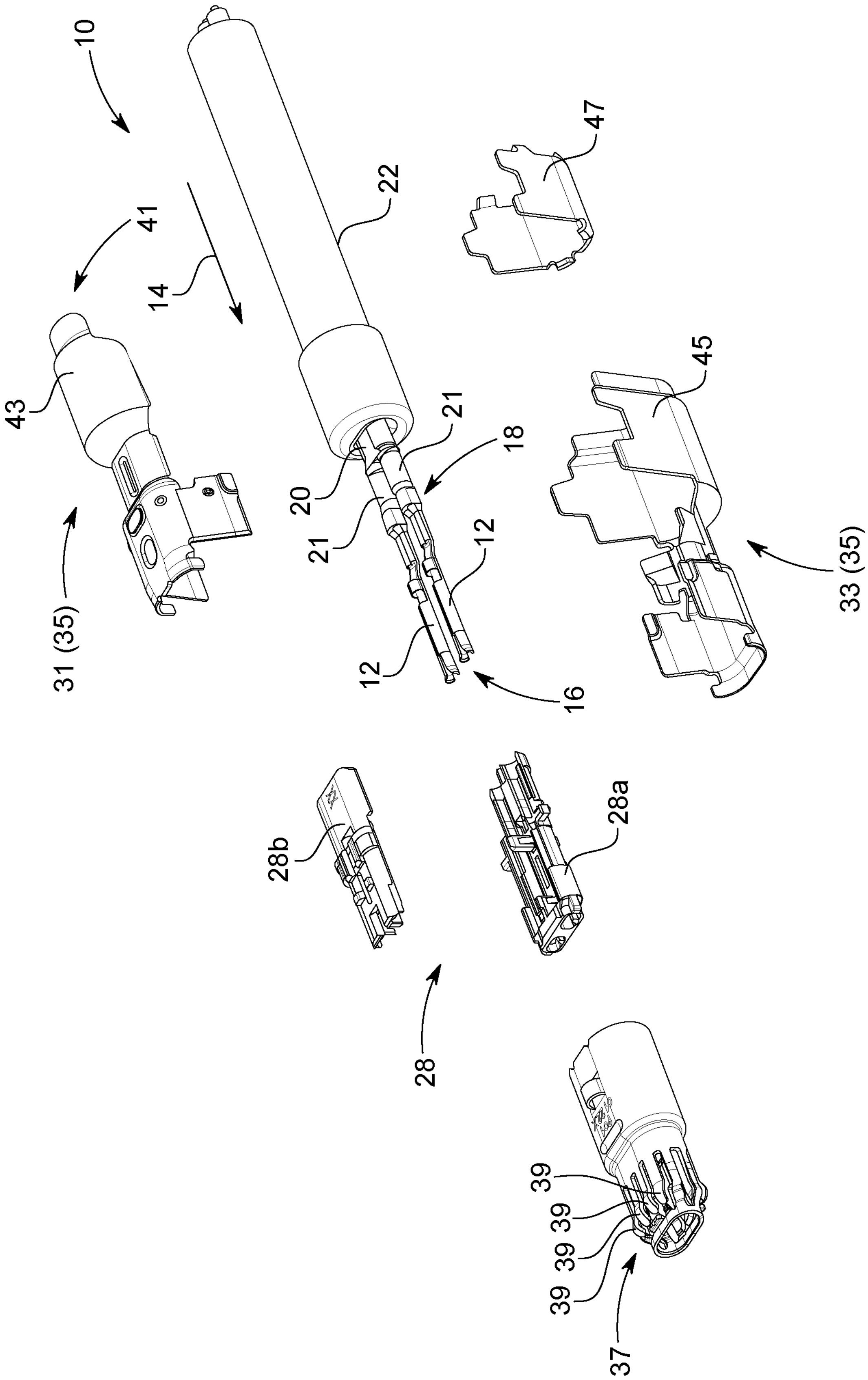
FIG. 1 is an exploded view of a connector according to an embodiment.

FIG. 1 depicts an exploded view of a connector 10, in particular a female connector, comprising two elongated inner signal contacts 12 arranged generally parallel to each other along an axial direction 14 of the connector 10. The signal contacts 12 have a first connection portion 16 for connecting the connector 10 to a mating connector, in particular a male connector, and a second connection portion 18 for connecting the signal contacts 12 to respective conductors 21 of a cable 22. The conductors 21 may be strands. Furthermore, the conductors 21 may be embedded in a wire insulation 20. The second connection portion 18 may include a termination element 24 comprising, for example, two crimping wings (shown in FIGS. 3A and 3B) or may have a welding portion having a welding opening 26 (shown in FIG. 3C). The welding opening 26 may be used to connect the signal contacts 12 to respective conductors 21 of the cable 22 via laser welding or ultrasonic welding. Alternatively, resistance welding can be used to connect the signal contacts 12 to respective conductors 21 of the cable 22.

The inner signal contacts 12 are arranged in an insulating element 28 which may form a di-electric housing. In the embodiment shown in FIG. 1, the insulating element 28 comprises two separate insulating parts, a first insulating element 28*a* and a second insulating element 28*b*, which together enclose the inner signal contacts 12. The first insulating element 28*a* and the second insulating element 28*b* may be attached to each other, for example, by a click-on connection, i.e., by a snap fit engagement. It is to be understood that the first insulating element 28*a* and the second insulating element 28*b* may be attached to each other by other suitable connections, as will be described further below. Furthermore, it is to be understood that the insulating element 28 may also be a one-part insulating element 28, for example, produced by injection molding, i.e., by overmolding the inner signal contacts 12. In such an insulating element 28, undesirable air pockets may be minimized.

The first insulating element 28*a* fulfills the task of locking the signal contacts 12 in the axial direction 14 so that the inner signal contacts 12 maintain their axial position when the connector 10 is connected to a mating connector. It is to be understood that, additionally or alternatively, the second insulating element 28*b* may fulfill the task of locking the signal contacts 12 in the axial direction 14.

The connector 10 further comprises a first shielding part 31 and a second shielding part 33 both formed as half shells which together form an outer shielding contact 35. The outer shielding contact 35 surrounds the inner signal contacts 12 and the insulating element 28 to provide a shield against interfering signals. However, the outer shielding contact 35 can also be used as an electrical conductor to transport electric power. At a distal end 37 of the connector 10, the connector 10 comprises multiple shielding contacts 39. At a proximal end 41 of the connector 10, the first shielding part 31 forms a cover 43. The second shielding part 33 forms a crimping portion 45 at the proximal end 41 of the connector 10 to mechanically and electrically connect the outer shielding contact 35 to the cable 22. Furthermore, the connector 10 comprises an inner crimp ferrule 47 which is placed around the cable 22.

Figure 2A:
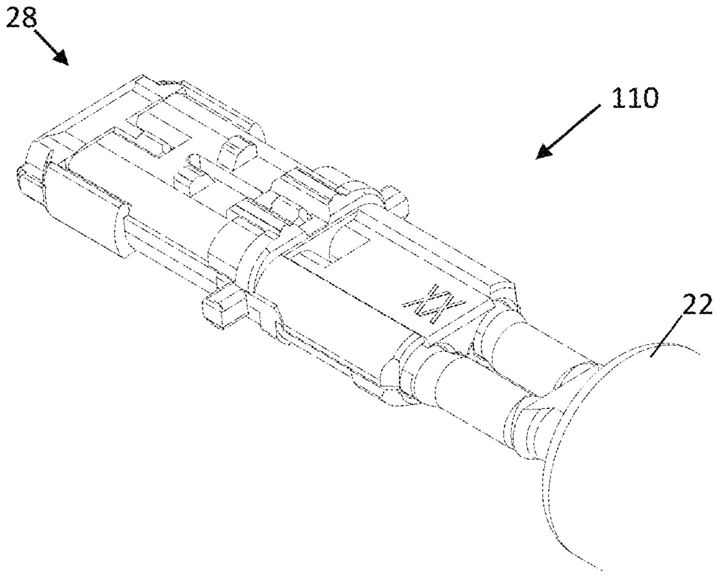
FIG. 2A is an isometric view of a connector assembly according to an embodiment.
Figure 2B:
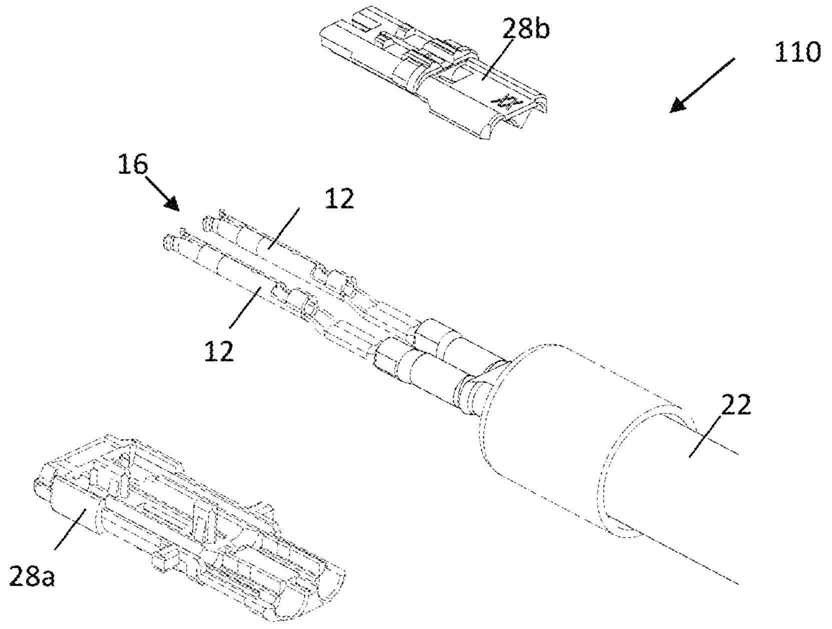
FIG. 2B is an exploded view of the connector assembly of FIG. 2A according to an embodiment.

The inner signal contacts 12 and the insulating element 28 together form a connector assembly 110 according to an embodiment of the present disclosure, as shown in FIG. 2A. FIG. 2B shows an exploded view of the connector assembly 110.

Figure 3A:
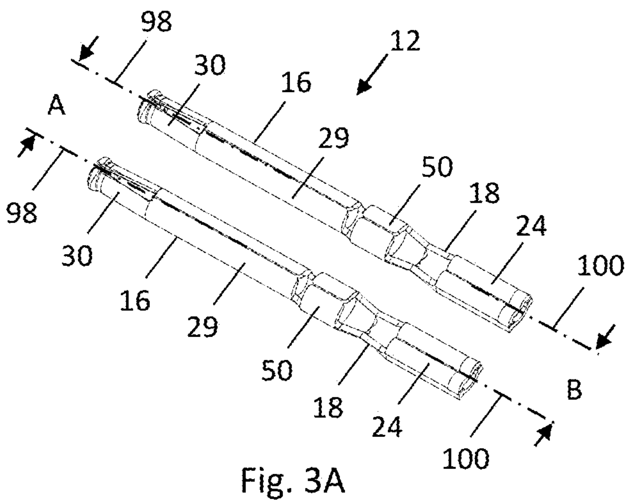
FIG. 3A is an isometric view of inner signal contacts according to an embodiment.
Figure 3B:
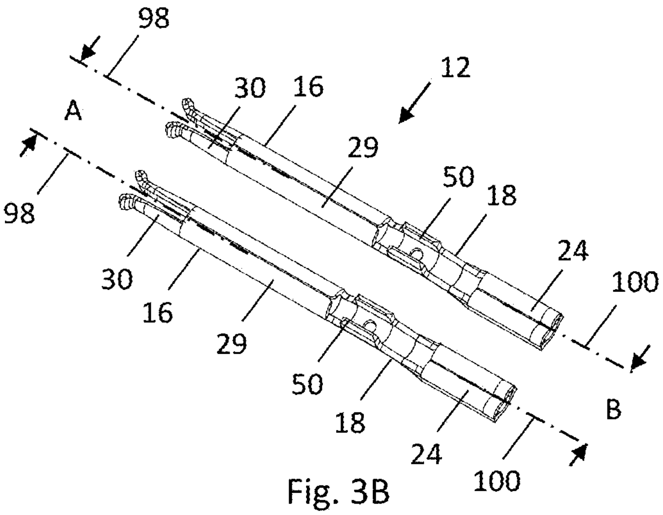
FIG. 3B is an isometric view of inner signal contacts according to an embodiment.
Figure 3C:
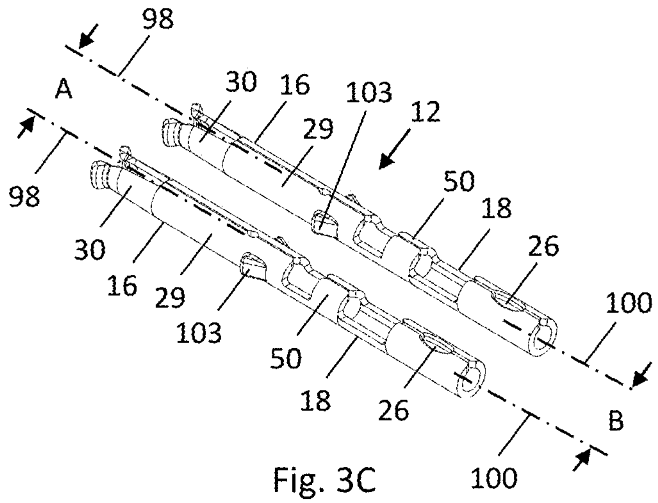
FIG. 3C is an isometric view of inner signal contacts according to an embodiment.

FIGS. 3A, 3B and 3C depict an isometric view of the inner signal contacts 12 according to various embodiments. The inner signal contacts 12 generally extend parallel to one another. Each inner signal contact 12 has a first connection portion 16 for connecting the signal contact 12 to a mating signal contact and a second connection portion 18 for connecting the signal contact 12 to a respective conductor 21 of a cable 22 (FIG. 1). The first connection portion 16 has a tube-like main section 29 defining a first center axis 98 and a funnel-shaped end section 30, wherein the tube-like main section 29 may have a round, in particular a generally circular or oval, or a polygonal cross-section. The second connection portion 18 defines a second center axis 100 where a center axis of the cable 22 is placed. A distance A between the center axes 98 of the first connection portions 16 may be equal or larger than a distance B between the second center axis 100 of the second connection portions 18. Alternatively, a distance A between the center axes 98 of the first connection portions 16 may be smaller than a distance B between the second center axis 100 of the second connection portions 18. In other words, the inner signal contacts 12 may be formed so that a pitch translation may be generated. Each of the inner signal contacts 12 may be formed so that the first center axis 98 is spaced apart in parallel from the second center axis 100.

In another embodiment, shown in FIG. 3C, the inner signal contacts 12 differ from the inner signal contacts 12 of FIGS. 3A and 3B in that hooks 103 are formed at side surfaces of the first connection portions 16. The hooks 103 help to axially fix the inner signal contacts 12 in the insulating element 28.

The second connection portions 18 of the inner signal contacts 12 may comprise welding openings 26 (FIG. 3C) that are arranged to allow, for example, a laser beam to weld a conductor 21 to the inner signal contacts 12. Alternatively, termination elements 24 can be formed at the second connection portions 18 so that the inner signal contacts 12 can be attached onto the wires insulating 20 of the cable 22 (FIGS. 3A and 3B).

The inner signal contacts 12 may comprise signal contact portions 50. In one embodiment, the signal contact portions 50 may have an oval cross-section, as shown in FIG. 3A. In another embodiment the signal contact portions 50 may have a U-shaped cross-section, as shown in FIG. 3B. In yet another embodiment, the signal contact portions 50 may have a circular cross-section, as shown in FIG. 3C. It is to be understood that the shape of the signal contact portions 50 is not limited to the shapes shown in FIGS. 3A to 3C. Rather, the signal contact portions 50 may be of any suitable shape. The signal portions 50 may be configured to at least reduce or even prevent a rotation and/or an axial movement of the at least one elongated inner signal contact 12 relative to the insulating element 28. The signal portions 50 may be defined as blocking elements that provide a forward stop and/or a backward stop for the at least one elongated inner signal contact 12 in the insulating element 28. A precise rotational control and limitation of movement of the inner signal contact 12 as well as a precise rigid back and forward stop of the inner signal contact 12 may thus be achieved. The signal portions 50 may also be configured to receive a wire insulation 20.

Figure 4A:
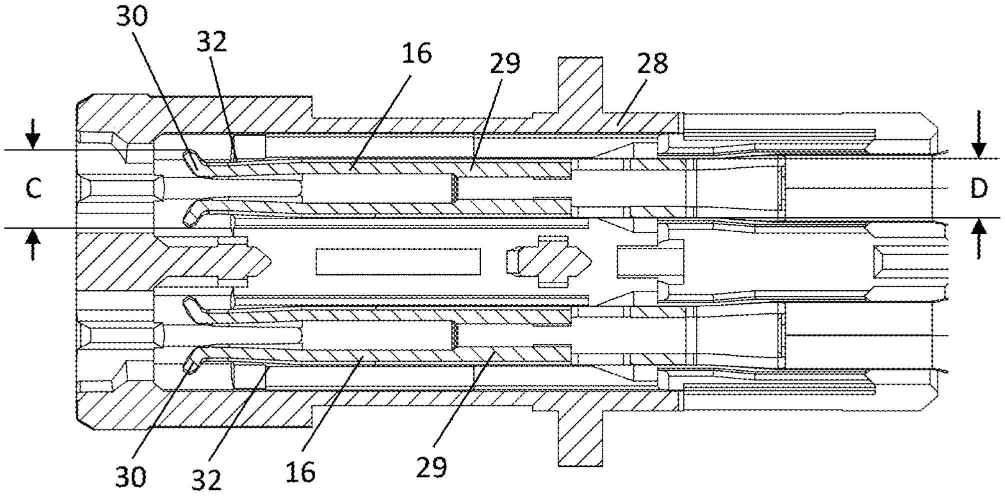
FIG. 4A is a cross-sectional view of the connector assembly in a partly assembled state according to an embodiment.
Figure 4B:
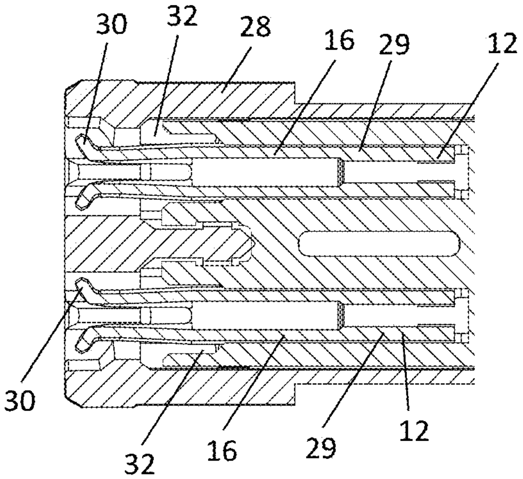
FIG. 4B is a cross-sectional view of the connector assembly in a fully assembled state according to an embodiment.

FIGS. 4A and 4B show cross-sectional views of a connector assembly 110 in a partly assembled state (FIG. 4A) and in a fully assembled state (FIG. 4B). The connector assembly 110 comprises at least one elongated inner signal contact 12, in the present embodiment two inner signal contacts 12. Each inner signal contact 12 comprises a first connection portion 16 having a tube-like main section 29 and a funnel-shaped end section 30. The tube-like main section 29 may have a round, in particular a generally circular or oval, or a polygonal cross-section. The funnel-shaped end section 30 expands from one end of the tube-like main section 29 such that a maximum outer cross-sectional dimension C of the funnel-shaped end section 30 is greater than a maximum outer cross-sectional dimension of the tube-like main section 29.

The at least one elongated inner signal contact 12 is accommodated in an elongated cavity 32 of the insulating element 28. A first part of the cavity 32 is designed to generally form fittingly receive the tube-like main section 29, i.e., a cross-sectional dimension of the first part of the cavity 32 is generally equal to the outer cross-sectional dimension of the tube-like main section 29, and a second part of the cavity 32 makes room for the funnel-shaped end section 30. In other words, a cross-sectional dimension D of the first part of the cavity 32, also referred to as a minimum cross-sectional dimension D of the cavity 32, corresponds to the outer cross-sectional dimension of the tube-like main section 29, whereas a cross-sectional dimension of the second part of the cavity 32, also referred to as a maximum cross-sectional dimension of the cavity 32, is at least equal to or greater than the maximum outer cross-sectional dimension C of the funnel-shaped end section 30. Since the maximum outer cross-sectional dimension C of the funnel-shaped end section 30 is greater than the maximum outer cross-sectional dimension of the tube-like main section 29, the maximum outer cross-sectional dimension C of the flaring funnel-shaped end section 30 is also greater than the cross-sectional dimension D of the first part of the cavity 32, i.e., the minimum cross-sectional dimension D of the cavity 32. It is to be understood that the dimensions described herein may be diameters if the tube-like main section 29 and the cavity 32 are of circular cross-section.

Figure 5A:
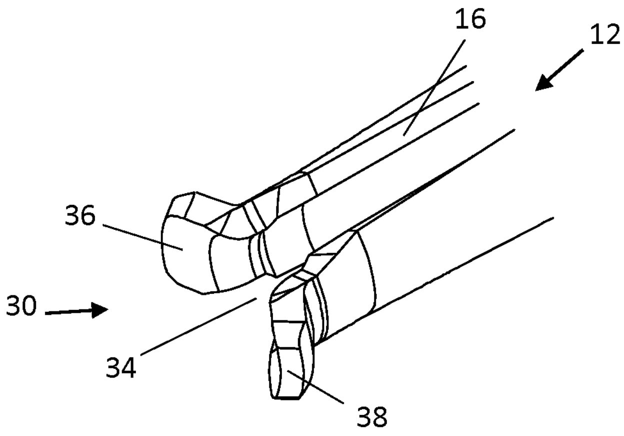
FIG. 5A is an isometric view of a funnel-shaped end section of an inner signal contact according to an embodiment.
Figure 5B:
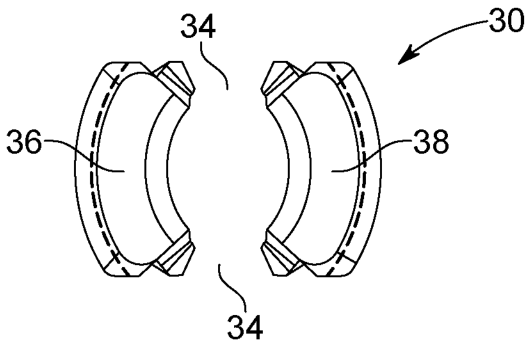
FIG. 5B is a cross-sectional view of the funnel-shaped end section according to an embodiment.

FIGS. 5A and 5B show an isometric view and a cross-sectional view, respectively, of the funnel-shaped end section 30 of the inner contact 12. The funnel-shaped end section 30 comprises a first end section part 36 and a second end section part 38. The first end section part 36 and the second end section part 38 are separated by two air gaps 34, i.e., there is a clearance between the first end section part 36 and the second end section part 38. The first end section part 36 and the second end section part 38 may be diagonally arranged, i.e., arranged opposite from each other. Accordingly, the two air gaps 34 may be diagonally arranged, i.e., arranged opposite from each other.

Figure 6A:
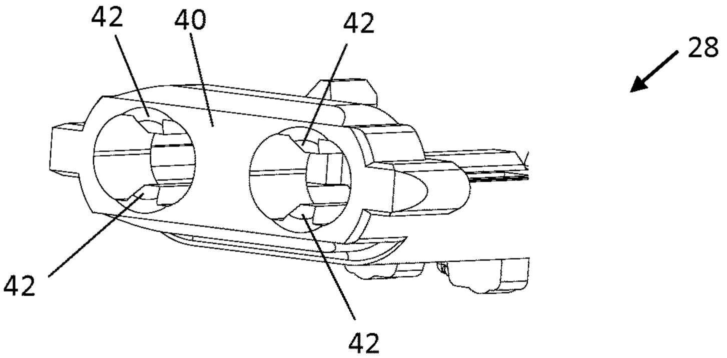
FIG. 6A is an isometric view of front openings of an insulating element according to an embodiment.
Figure 6B:
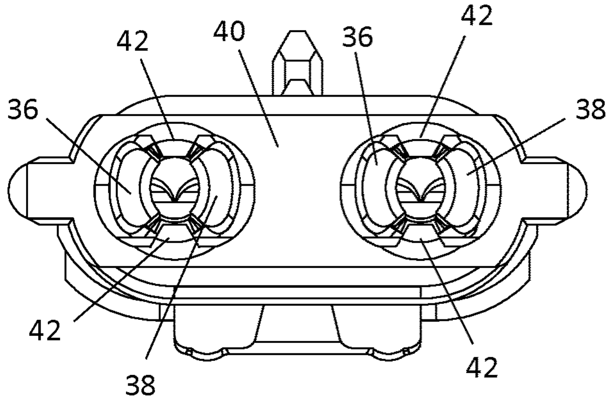
FIG. 6B is a front view of the front openings having inner signal contacts according to an embodiment.
Figure 6C:
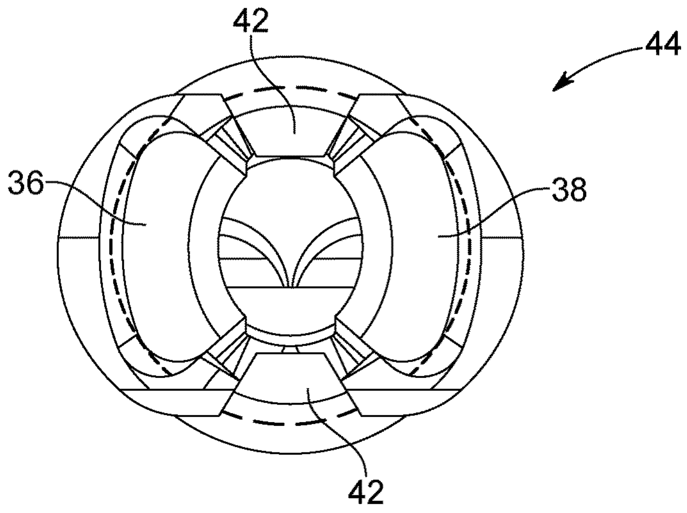
FIG. 6C is a front view of an inlet opening defined by the inner signal contacts according to an embodiment.

As shown in FIGS. 6A to 6C, each cavity 32 ends in a front opening 40 of the insulating element 28, which allows a mating contact to be connected to the inner contact 12 arranged in the cavity 32. Each front opening 40 is configured to receive the funnel-shaped end section 30 of the inner signal contact 12. Two, for example, diagonally arranged chamfers 42 protrude into the front opening 40 and, more specifically, into the air gaps 34 of the funnel-shaped end section 30 received in the front opening 40.

When the funnel-shaped end section 30 is received in the front opening 40, the first end section part 36, the second end section part 38 and the two chamfers 42 together define an inlet 44 configured to correctly guide a matching male signal contact (not shown) into the female inner signal contact 12. The inlet 44 may form a 360-degree lead-in cone, in particular having an at least substantially closed perimeter, to guide the male signal contact into the inner signal contact 12. Depending on the geometrical definition of the end section parts 36, 38 and the corresponding chamfers 42, the inlet may be of round, in particular circular or oval, or of polygonal cross-section.

Figure 7A:
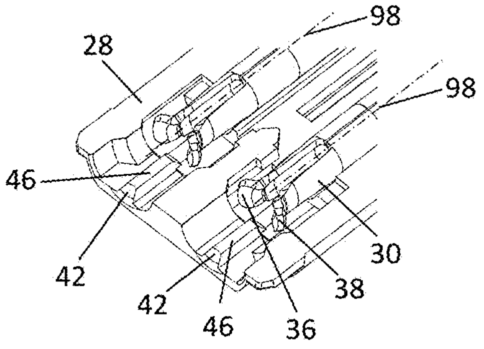
FIG. 7A is an isometric view of a part of an insulating element having inner signal contacts in a partly assembled state according to an embodiment.
Figure 7B:
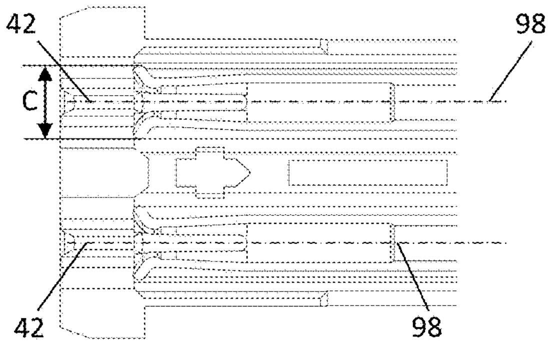
FIG. 7B is a cross-sectional view of the part of the insulating element having the inner signal contacts in the partly assembled state according to an embodiment.

FIGS. 7A and 7B show a part of the insulating element 28 having inner signal contacts 12 in a partly assembled state of the connector assembly 110. The insulating element 28 comprises at least one rib 46 in each cavity 32, wherein the rib 46 may be an extension of one of the chamfers 42 in a direction of the first center axis 98 defined by the respective inner signal contact 12. The rib 46 engages one of the air gaps 34 when the funnel-shaped end section 30 of the inner signal contact 12 is inserted into the front opening 40 and thereby widens the funnel-shaped end section 30. In a not fully assembled state (FIGS. 7A and 7B), the funnel-shaped end section 30 of the inner signal contact 12 is not in contact with the rib 46 and, thus, is in a relaxed state.

Figure 7C:
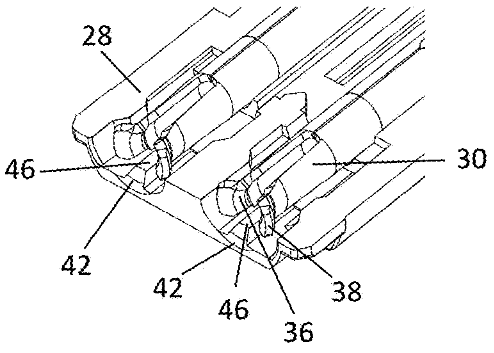
FIG. 7C is an isometric view of the part of the insulating element having inner signal contacts in a fully assembled state according to an embodiment.
Figure 7D:
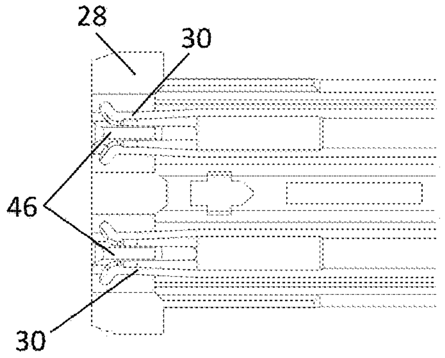
FIG. 7D is a cross-sectional view of the part of the insulating element having inner signal contacts in the fully assembled state according to an embodiment.

FIG. 7C shows an isometric view and FIG. 7D shows a cross-sectional view of the part of the insulating element 28 having inner signal contacts 12 in a fully assembled state of the connector assembly 110. When the inner signal contacts 12 are inserted into the insulating element 28, the funnel-shaped end section 30, in particular the first end section part 36 and the second end section part 38 are pushed apart by the rib 46 as shown in FIGS. 7C and 7D.

FIGS. 8A to 8F show cross-sectional top views and a cross-sectional side views of further embodiments of the connector assembly 110 in which the insulating element 28 comprises at least one protrusion 52 and at least one recess 54 for each inner signal contact 12. The at least one respective inner signal contact 12 also comprises at least one protrusion 56 and at least one recess 58, respectively. The at least one protrusion 52 of the insulating element 28 engages with the at least one recess 58 of the inner signal contact 12, and vice versa. In other words, the protrusions 52, 56 and the recesses 54, 58 are configured to cooperate in order to substantially prevent a rotation and/or an axial movement of the inner signal contact 12 relative to the insulating element 28. More specifically, the rotation and/or the axial movement of the inner signal contact 12 relative to the insulating element 28 is reduced, or minimized, or limited to some degree, such that only an insignificant amount of rotation and axial movement of the inner signal contact 12 relative to the insulating element 28 may occur.

Figure 8A:
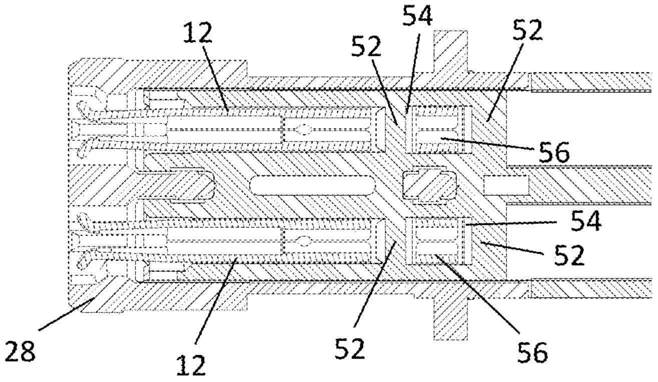
FIG. 8A is a cross-sectional top view of a connector assembly according to an embodiment.
Figure 8B:
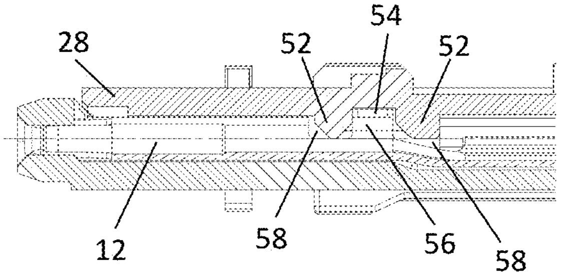
FIG. 8B is a cross-sectional side view of the connector assembly of FIG. 8A according to an embodiment.
Figure 8C:
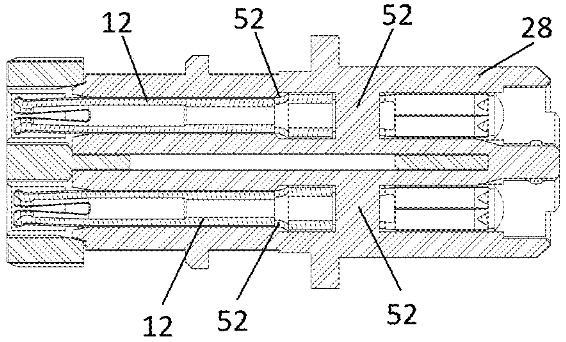
FIG. 8C is a cross-sectional top view of a connector assembly according to another embodiment according to an embodiment.
Figure 8D:
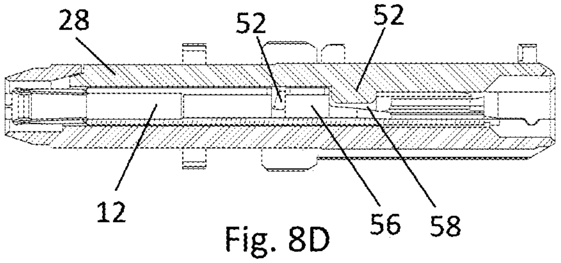
FIG. 8D is a cross-sectional side view of the connector assembly of FIG. 8C according to an embodiment.
Figure 8E:
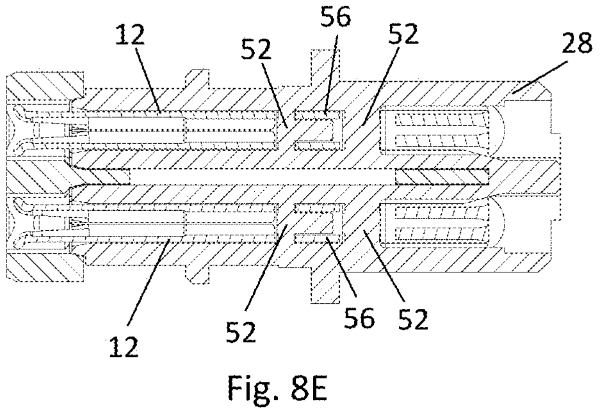
FIG. 8E is a cross-sectional top view of a connector assembly according to an embodiment.
Figure 8F:
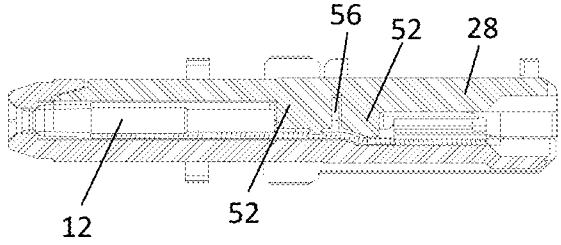
FIG. 8F is a cross-sectional side view of the connector assembly of FIG. 8E according to an embodiment.

The insulating element 28 may comprise two protrusions 52 for each inner signal contact 12, wherein one protrusion 52 of the insulating element 28 is arranged in front of the protrusion 56 of the inner signal contact 12 and one protrusion 52 of the insulating element 28 is arranged behind the protrusion 56 of the inner signal contact 12, as shown in FIGS. 8A to 8C. The protrusion 52 of the insulating element 28 arranged in front of the protrusion 56 of the inner signal contact 12 may act as a forward stop or a backward stop and the protrusion 52 of the insulating element 28 arranged behind the protrusion 56 of the inner signal contact 12 may act as a backward stop. A forward stop may reduce or even prevent an axial movement of the at least one elongated inner signal contact 12 relative to the insulating element 28 in a forward direction, i.e., in a direction towards the funnel-shaped end section 30 of the inner signal contact 12. A backward stop may reduce or even prevent an axial movement of the at least one elongated inner signal contact 12 relative to the insulating element 28 in a backward direction, i.e., in a direction towards the second connection portion 18 of the inner signal contact 12.

Figure 9A:
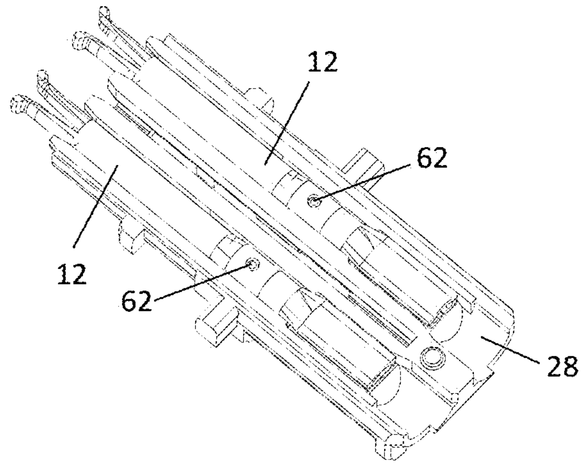
FIG. 9A is an isometric view of a part of an insulating element having inner signal contacts according to an embodiment.
Figure 9B:
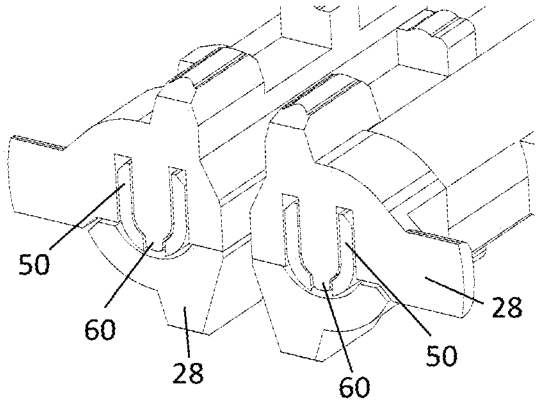
FIG. 9B is an isometric cross-sectional view of the part of the insulating element having inner signal contacts according to an embodiment.
Figure 9C:
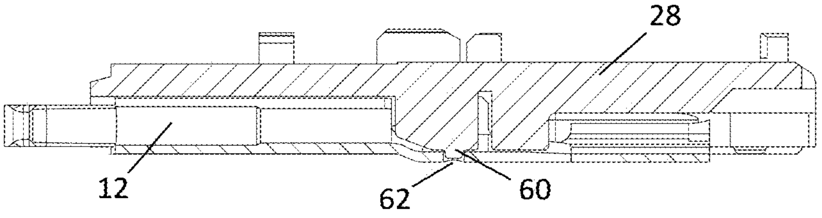
FIG. 9C is a cross-sectional side view of the part of the insulating element having inner signal contacts according to an embodiment.

FIG. 9A shows an isometric view of a part of an insulating element 28 having two inner signal contacts 12 wherein each inner signal contact 12 comprises a hole 62 defined to receive a corresponding control elements 60 of the insulating element 28. The control elements 60 are arranged such that they engage with the holes 62 when the connector assembly 110 is correctly assembled, i.e., when the inner signal contacts 12 are correctly embedded in the insulating element 28. FIG. 9B and FIG. 9C show the control elements 60 inserted into the holes 62 of U-shaped signal contact portions 50 of the inner signal contacts 12. It is to be understood that the holes 62 and, thus, the control elements 60 may also be arranged at other parts of the inner signal contacts 12. The control elements 60 are visible in the holes 62 of the inner signal contacts 12 when the inner signal contacts 12 reach an end-position during the assembling of the connector assembly 110. Thus, a visual control of the end-position of the inner signal contacts 12 is possible when the inner signal contacts 12 are mounted in the insulating element 28.

Figure 10A:
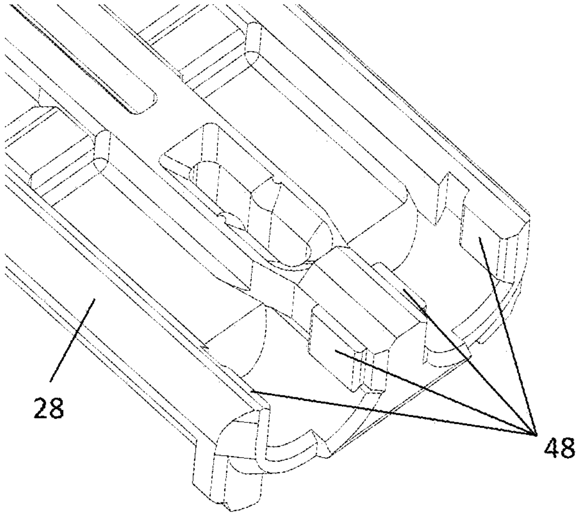
FIG. 10A is an isometric view of a part of an insulating element according to an embodiment.
Figure 10B:
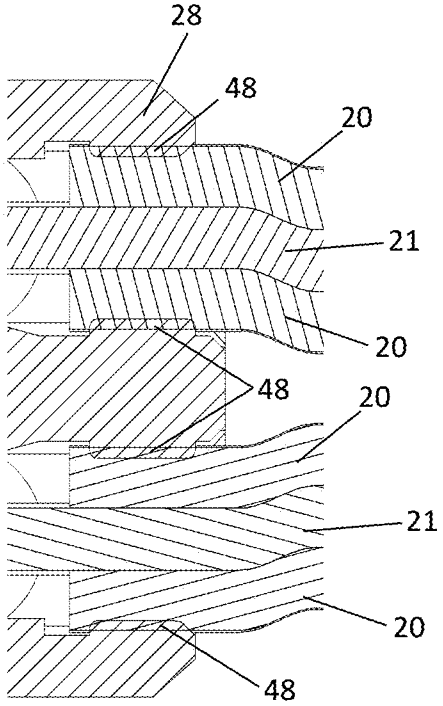
FIG. 10B is a cross-sectional top view of the part of the insulating element having wires according to an embodiment.

FIGS. 10A and 10B show an insulating element 28 according to a further embodiment. The insulating element 28 comprises at least one clamping element 48 in each cavity 32, which is configured to secure the wire insulation 20 of a cable 22 (not shown) and/or a conductor 21 to which the respective inner signal contact 12 is connected. To secure the wire insulation 20 or the conductor 21 in the insulating element 28, a gap defined by two opposing clamping elements 48 is less than a main diameter of the wire insulation 20 or the conductor 21. Thus, the wire insulation 20 or the conductor 21 is clamped in the insulating element 28 when the wire insulation 20 or the conductor 21 is inserted into the gap.

Figure 11A:
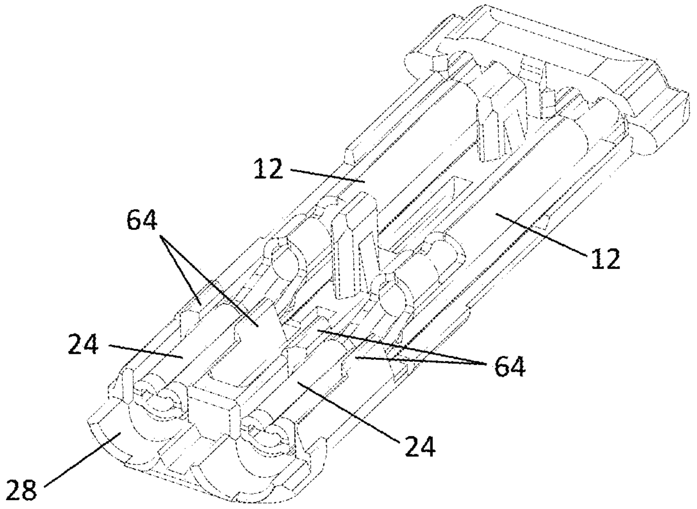
FIG. 11A is an isometric view of a part of a further embodiment of an insulating element having inner signal contacts according to an embodiment.

FIG. 11A shows an isometric view of a part of the insulating element 28 having two inner signal contacts 12 according to a further embodiment. The inner signal contacts 12 each comprise a termination element 24, for example, a pair of crimping wings, arranged at the second connection portion 18, wherein the termination element 24 may be configured to secure a wire insulation 20 or a conductor 21, e.g., a conductor, in the inner signal contact 12. The insulating element 28 comprises at least one retaining element 64 for each inner signal contact 12, which is configured to secure at least one of the respective termination element 24, the respective wire insulation 20, the conductor 21 and a respective signal contact portion 50 in the insulating element 28. Each retaining element 64 may be designed as a snap arm, wherein two opposing retaining elements 64 may form a cavity that is configured to hold or secure the termination element 24 or the wire insulation 20.

Figure 11B:
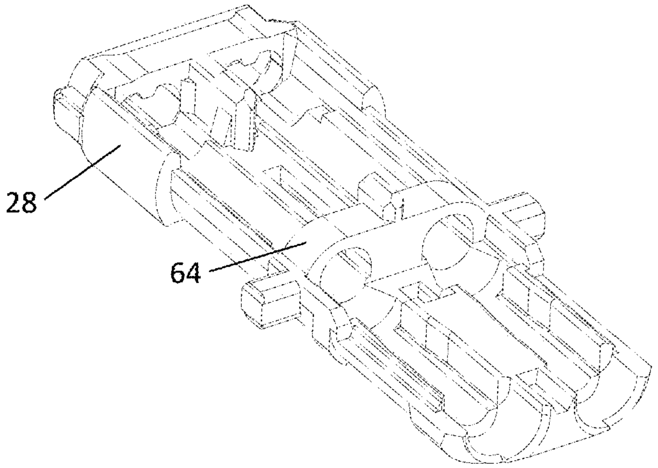
FIG. 11B is an isometric view of a part of a further embodiment of an insulating element according to an embodiment.

FIG. 11B shows another embodiment of a part of an insulating element 28 in which the retaining element 64 is designed as a bracket that encloses at least one of the termination element 24, the wire insulation 20, the conductor 21 and the signal contact 50. The shape of the bracket may be adapted to the contour of the received element. For example, the bracket may define circular cavities to receive the signal contact portions 50 of the inner signal contacts 12.

Figure 12A:
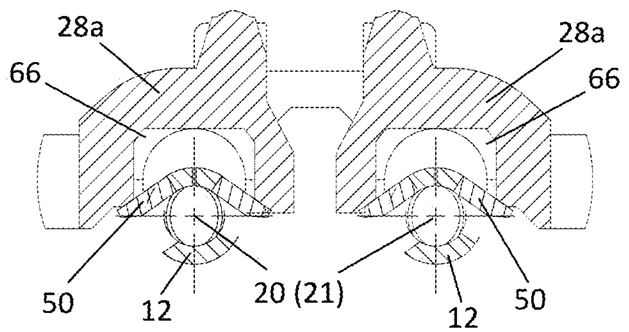
FIG. 12A is a cross-sectional view of a first embodiment of a first insulating element having inner signal contacts in a partly assembled state according to an embodiment.
Figure 12B:
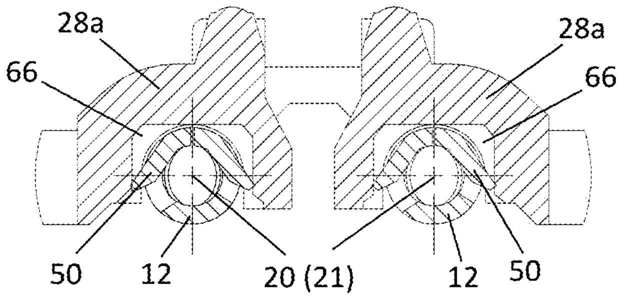
FIG. 12B is a cross-sectional view of the first embodiment of the first insulating element having inner signal contacts in a fully assembled state according to an embodiment.

FIG. 12A shows a cross-sectional view of a further embodiment of a first insulating element 28*a* having two inner signal contacts 12 in a partly assembled state. The first insulating element 28*a* may be radially mounted to the inner signal contacts 12. As shown in FIG. 12B, the inner signal contacts 12, in particular the signal contact portions 50, are pinched into the first insulating element 28*a* in a fully assembled state of the connector assembly 110. To this end, the signal contact portions 50 may have a greater cross-sectional dimension than respective cavities 66 of the first insulating element 28*a* (FIG. 12A). By pressing the signal contact portions 50 into the cavities 66, the cross-sectional dimension of the signal contact portions 50 is reduced to a cross-sectional dimension of the cavity 66 as shown in FIG. 12B. Furthermore, due to the reduction of the cross-sectional dimension of the signal contact portions 50, the wire insulations 20 or the conductors 21 attached to the inner signal contacts 12 are secured in the signal contact portions 50. The second insulating element 28*b* of the insulating element 28 may then be axially slid onto the inner signal contacts 12 in a direction of the first center axis 98 defined by the inner signal contacts 12 such that the inner signal contacts 12 are fully enclosed by the first insulating element 28*a* and the second insulating element 28*b*. A detailed description of an assembly process will be described further below.

Figure 12C:
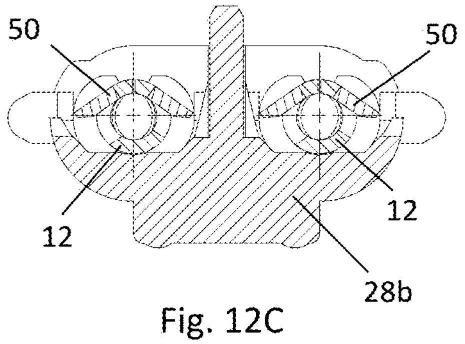
FIG. 12C is a cross-sectional view of a second embodiment of a second insulating element having the inner signal contacts in a final position, but not yet in a fully assembled state according to an embodiment.
Figure 12D:
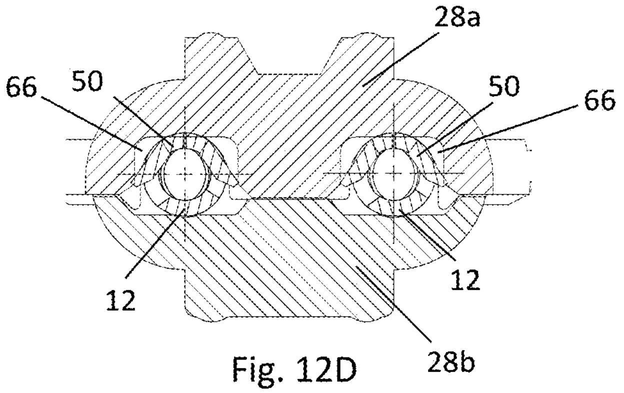
FIG. 12D is a cross-sectional view of the second embodiment of the first insulating element having the inner signal contacts in a fully assembled state according to an embodiment.

Alternatively, according to another embodiment, the inner signal contacts 12 may be inserted into the second insulating element 28*b* as shown in FIG. 12C. More specifically, FIG. 12C shows the inner signal contacts 12 in their final position in the second insulation part 28*b*, but not yet in their fully assembled state since the first insulating element 28*a* is still to be mounted. Thus, one elongated inner signal contact 12 is pinched into the first insulating element 28*a* by radially mounting the first insulating element 28*a* in respect of the at least one elongated inner signal contact 12 and the second insulating element 28*b*, as shown in FIG. 12D. The cross-sectional dimension of the signal contact 50 is reduced to a cross-sectional dimension of the cavity 66 by pressing the first insulating element 28*a* onto the signal contact 50. Thus, the inner signal contact 12, in particular the signal contact 50, is pinched into the first insulating element 28*a* as shown in FIG. 12 D in a fully assembled state of the connector assembly 110.

Figure 13A:
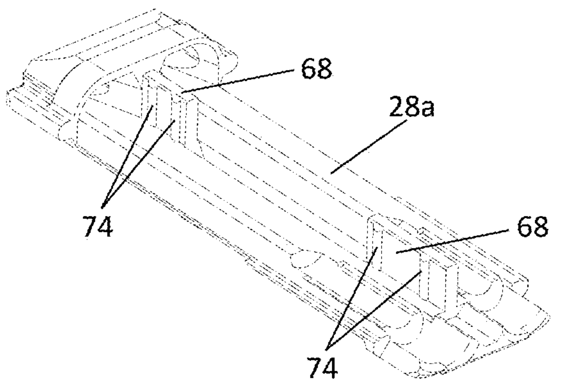
FIG. 13A is an isometric view of a first embodiment of a first insulating element having two press-fit elements according to an embodiment.
Figure 13B:
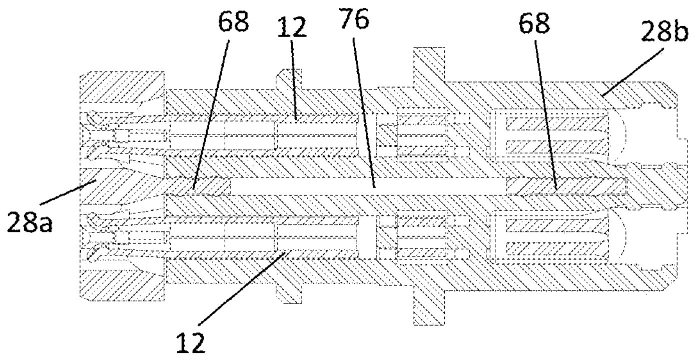
FIG. 13B is a cross-sectional top view of the first insulating element according to an embodiment.
Figure 13C:
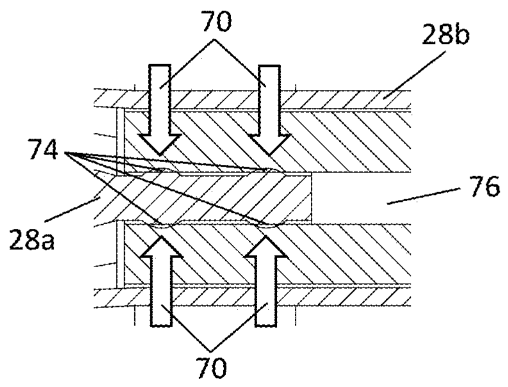
FIG. 13C is a cross-sectional view of one of the press-fit elements engaging a second insulating element according to an embodiment.
Figure 14A:
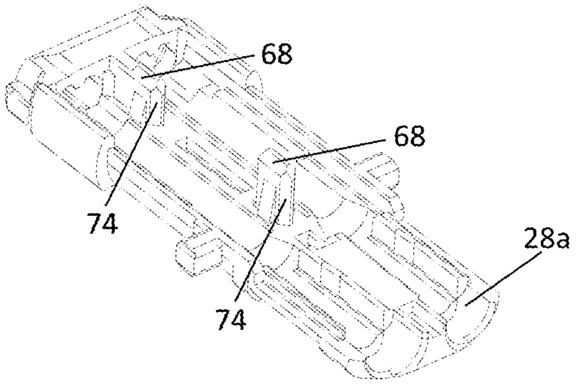
FIG. 14A is an isometric view of a second embodiment of a first insulating element having two press-fit elements according to an embodiment.

FIGS. 13A to 13C and 14A to 14C show two embodiments of a first insulating element 28*a* having two press fit elements 68. The press fit elements 68 may be formed as cuboidal elements having protrusions 74 that protrude over the surfaces of the cuboidal elements, as shown in FIGS. 13A and 14A. Respective elements of the second insulating element 28*b* may be formed as cuboidal recesses 76 configured to receive the press fit elements 68 of the first insulating element 28*a*. A cross-sectional dimension of the cuboidal recesses 76 may be substantially the same as a cross-sectional dimension of the corresponding press fit elements 68 (the protrusions 74 not considered). When the first insulating element 28*a* and the second insulating element 28_b_ are radially mounted to the inner signal contacts 12, the press fit elements 68 are inserted into the corresponding cuboidal recesses 76. The press fit elements 68 are secured in the recesses 76 by means of the protrusions 74. More specifically, the press fit elements 68 have to be pressed into the recesses 76 since the protrusions 74 lead to a cross-sectional dimension of the press fit elements 68 greater than that of the recesses 76. Depending on the arrangement of the protrusions 74, either radial forces 70 (FIG. 13C) or axial forces 72 (FIG. 14C) act between the first insulating element 28_a_, in particular the press fit elements 68, and the second insulating element 28_b_.

Figure 15A:
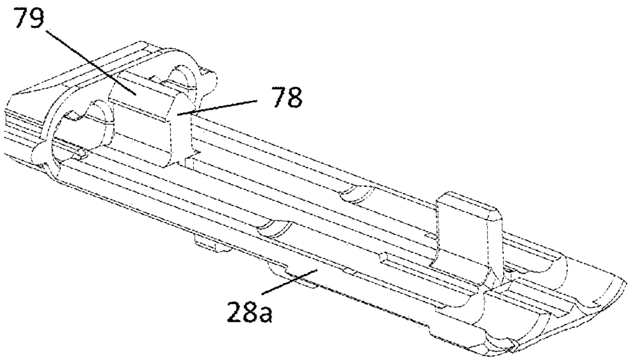
FIG. 15A is an isometric view of a first insulating element having a locking element according to a first embodiment according to an embodiment.
Figure 15B:
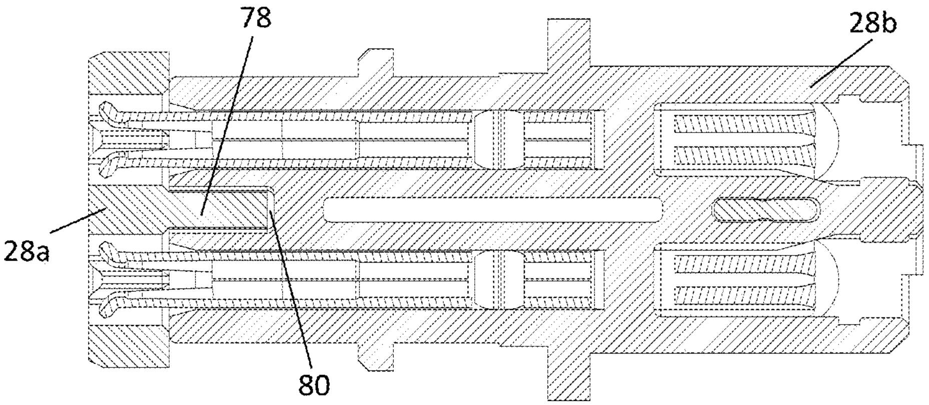
FIG. 15B is a cross-sectional top view of the first insulating element according to an embodiment.
Figure 15C:
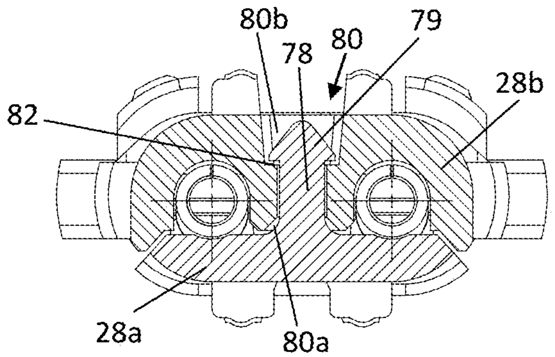
FIG. 15C is a cross-sectional view of the locking element engaging a second insulating element according to an embodiment.
Figure 16A:
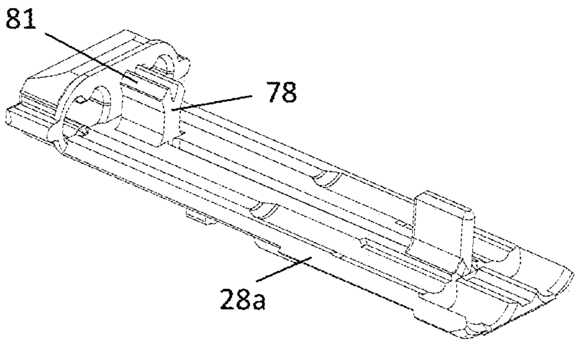
FIG. 16A is an isometric view of a first insulating element having a locking element according to a second embodiment according to an embodiment.
Figure 16B:
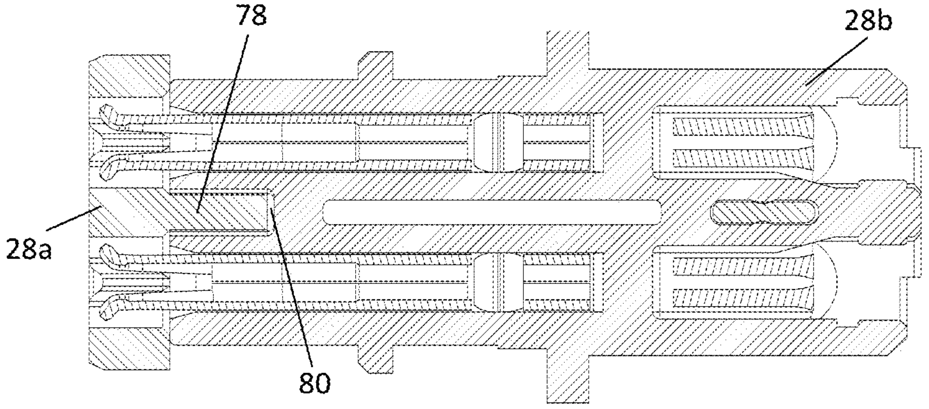
FIG. 16B is a cross-sectional top view of the first insulating element according to an embodiment.
Figure 16C:
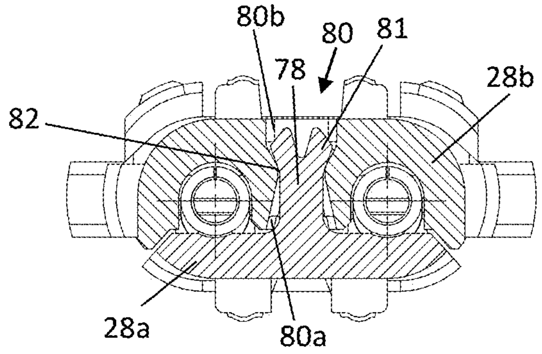
FIG. 16C is a cross-sectional view of the locking element engaging a second insulating element according to an embodiment.

According to other embodiments shown in FIGS. 15A to 15C and 16A to 16C, a first insulating element 28_a_ has at least one locking element 78. The locking element 78 may be formed as a cuboidal element having a mushroom head 79 (FIGS. 15A, 15C) or having a Y-shaped or forked head 81 (FIGS. 16A, 16C). The second insulating element 28_b_ comprises a substantially matching cuboidal locking recess 80 configured to receive the locking element 78 of the first insulating element 28_a_. The locking recess 80 may comprise a first recess part 80_a_ and a second recess part 80_b_, as shown in FIGS. 15C and 16C. A cross-sectional dimension of the first recess part 80_a_ may be substantially the same as a cross-sectional dimension of the cuboidal locking element 78, i.e., the cuboidal locking element 78 fits into the first recess part 80_a_. A maximum outer cross-sectional dimension of the mushroom head 79 or the fork head 81 is greater than the cross-sectional dimension of the first recess part 80_a_. Thus, the locking element 78 has to be pressed through the first recess part 80_a_ of the locking recess 80 until the mushroom head 79 or the fork head 81 reaches into the second recess part 80_b_. A cross-sectional dimension of the second recess part 80_b_ of the locking recess 80 is greater than the maximum outer cross-sectional dimension of the mushroom head 79 or the forked head 81 and, thus, also greater than the first recess part 80_a_ such that the first recess part 80_a_ and the second recess part 80_b_ of the locking recess 80 define a shoulder 82 at their transition (FIGS. 15C and 16C). When the locking element 78 is fully inserted into the locking recess 80, the mushroom head 79 or the forked head 81 sits on the shoulder 82 and thereby secures the first insulating element 28_a_ to the second insulating element 28_b_ (FIGS. 15C and 16C).

Figure 17A:
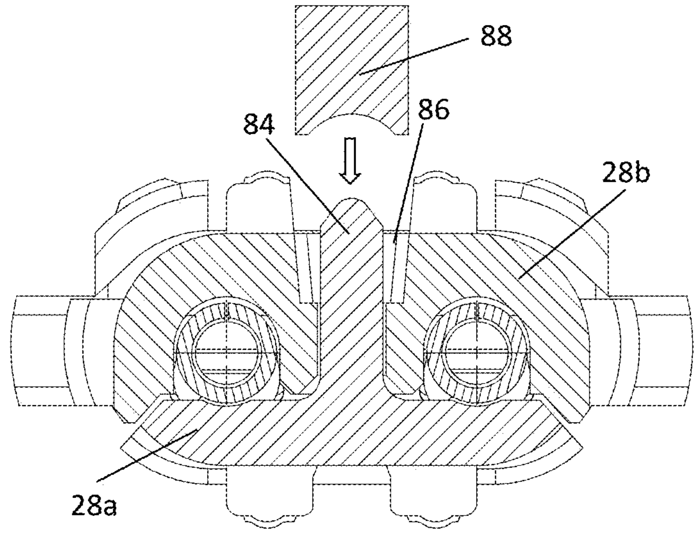
FIG. 17A is an isometric view of a first insulating element having a pin and a second insulating element having a slot in a partly assembled state according to an embodiment.
Figure 17B:
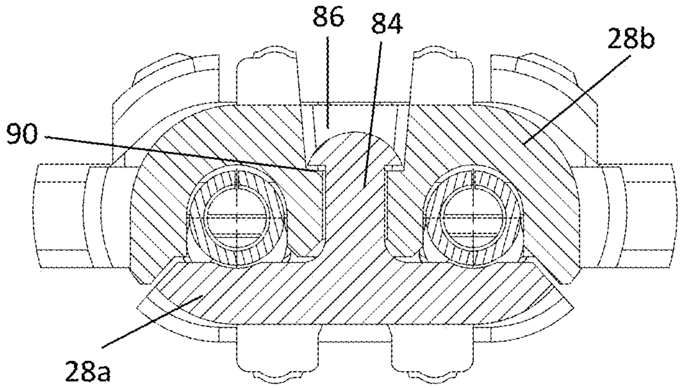
FIG. 17B is an isometric view of the first insulating element and the second insulating element in a fully assembled state according to an embodiment.

FIG. 17A shows an embodiment of a first insulating element 28_a_ and a second insulating element 28_b_ having a locking pin 84 and a locking slot 86, respectively, in a partly assembled state of the connector assembly 110. The locking slot 86 is configured to receive the locking pin 84. The locking slot 86 comprises a first slot part 86_a_ and a second slot part 86_b_. A cross-sectional dimension of the first slot part 86_a_ of the locking slot 86 may be substantially the same as a cross-sectional dimension of the locking pin 84, i.e., the locking pin 84 fits into the first slot part 86_a_ of the locking slot 86 (FIG. 17A). A cross-sectional dimension of the second slot part 86_b_ is greater than the cross-sectional dimension of the locking pin 84 such that the first slot part 86_a_ and the second slot part 86_b_ define a shoulder 90 (FIG. 17B). The locking slot 86 may be similar to the locking recess 80 described above. When the locking pin 84 is fully inserted into the locking slot 86 the locking pin 84 may be deformed by means of a punch tool 88. The punch tool 88 presses on to a free end of the locking pin 84 such as to deform the free end of the locking pin 84 into a mushroom head that sits on the shoulder 90, thereby securing the first insulating element 28_a_ to the second insulating element 28_b_ (FIG. 17B). The locking pin 84 may be deformable in a cold or a hot state, i.e., the locking pin 84 is deformable by means of the punch tool 88 with or without preheating the locking pin 84 or the punch tool 88.

Figure 18A:
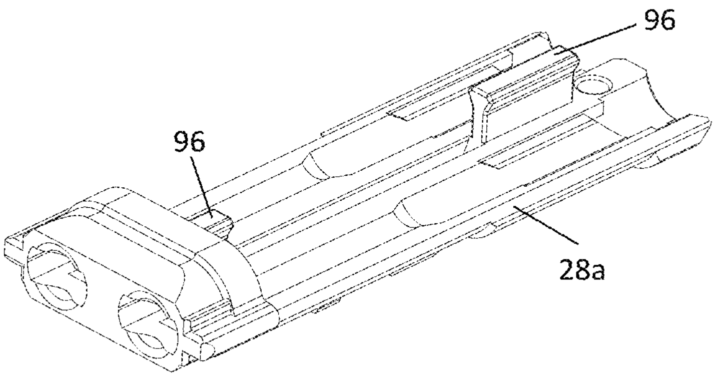
FIG. 18A is an isometric view of a first insulating element having two tongues according to an embodiment.
Figure 18B:
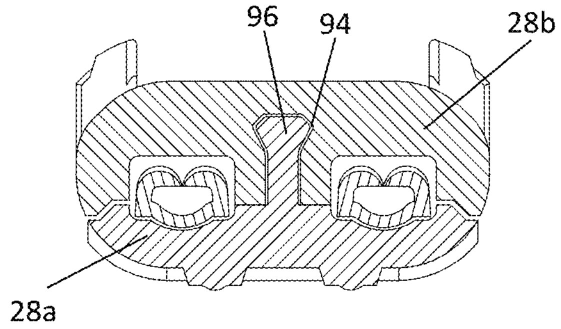
FIG. 18B is a cross-sectional view of the first insulating element and a second insulating element showing one of the tongues in a corresponding groove of the second insulating element according to an embodiment.
Figure 18C:
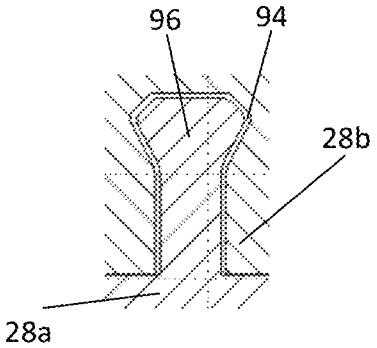
FIG. 18C is an enlarged view of the tongue in the groove according to an embodiment.
Figure 18D:
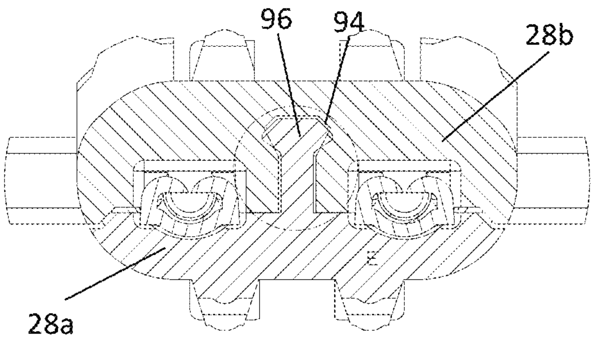
FIG. 18D is a cross-sectional view of a first insulating element having a tongue and a second insulating element having a groove according to an alternative embodiment according to an embodiment.
Figure 18E:
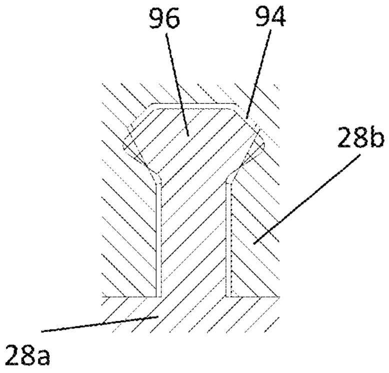
FIG. 18E is an enlarged view of the tongue in the groove according to an embodiment.
Figure 19A:
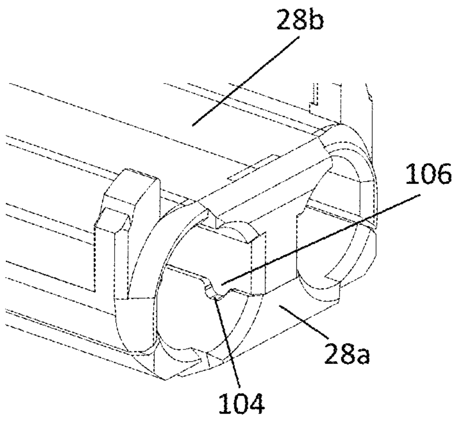
FIG. 19A is an isometric view of a first insulating element and a second insulating element according to a further embodiment according to an embodiment.
Figure 19B:
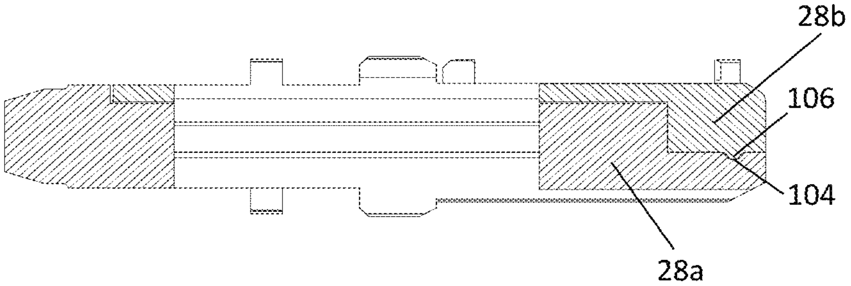
FIG. 19B is a view a cross-sectional view of the first insulating element and the second insulating element according to an embodiment.
Figure 20A:
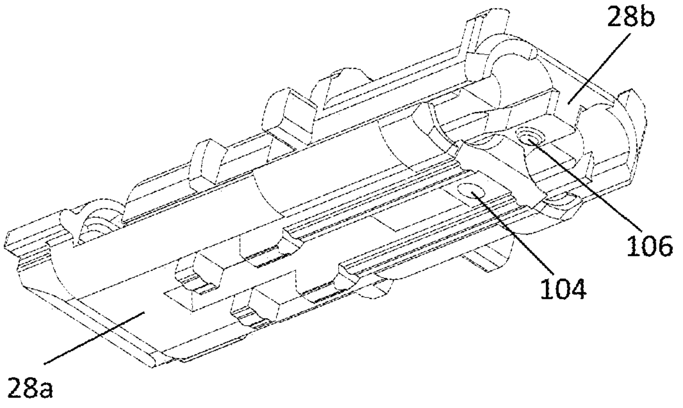
FIG. 20A is an isometric view of a first insulating element and a second insulating element according to an embodiment.
Figure 20B:
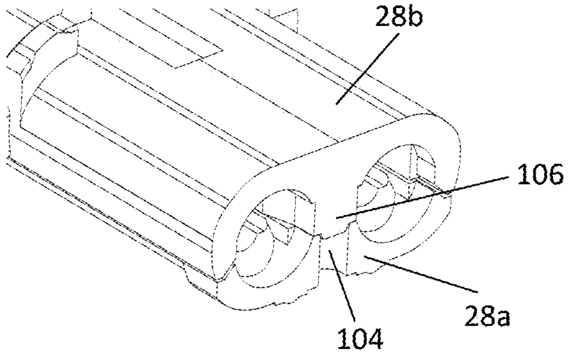
FIG. 20B is an isometric cross-sectional view of the first insulating element and the second insulating element according to an embodiment.
Figure 20C:
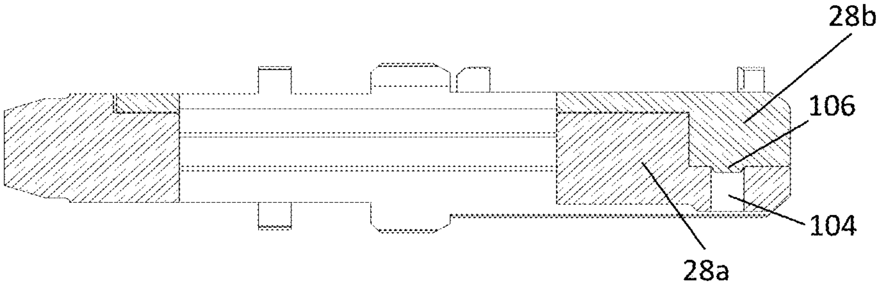
FIG. 20C is a cross-sectional side view of the first insulating element and the second insulating element according to an embodiment.

FIG. 18A shows a first insulating element 28_a_ having two tongues 96. The second insulating element 28_b_ comprises corresponding grooves 94 in which the tongues 96 can be received. The first insulating element 28_a_ is secured to the second insulating element 28_b_ by inserting the tongues 96 into their associated grooves 94 and axially sliding the first insulating element 28_a_ relative to the second insulating element 28_b_ in a direction of the center axes 98 defined by the inner signal contacts 12. FIGS. 18B and 18C show a cross-sectional view of one of the tongues 96 inserted into its associated groove 94. A maximum outer dimension of the tongue 96 may be substantially the same as a maximum inner dimension of the groove 94, i.e., the tongue 96 may fit into the groove 94. In an alternative embodiment shown in FIGS. 18D and 18E, the maximum outer dimension of the tongue 96 may be somewhat greater than the maximum inner dimension of the groove 94. Therefore, the tongue 96 has to be forced into the groove 94 and is somewhat deformed when fully inserted into the groove 94.

FIGS. 19A, 19B and 20A-20C show two embodiments of an insulating element 28 in which a first insulating element 28_a_ comprises a locking cavity 104 and a second insulating element 28_b_ comprises a locking protrusion 106 to be received in the locking cavity 104. The locking protrusion 106 extends into the locking cavity 104 when the connector assembly 110 is correctly assembled.

Figure 14B:
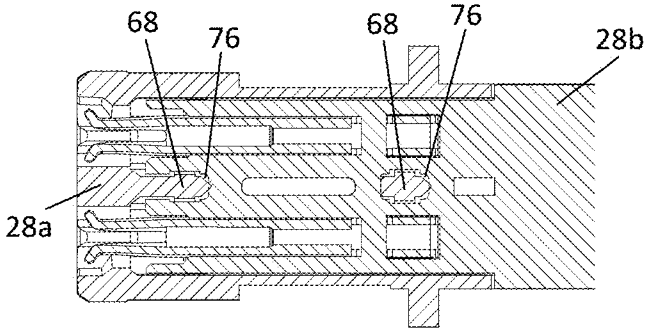
FIG. 14B is a cross-sectional top view of the first insulating element according to an embodiment.
Figure 14C:
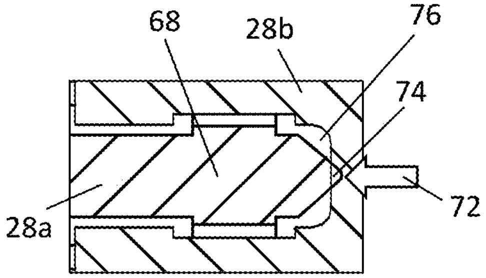
FIG. 14C is a cross-sectional view of one of the press-fit elements engaging a second insulating element according to an embodiment.
Figure 21A:
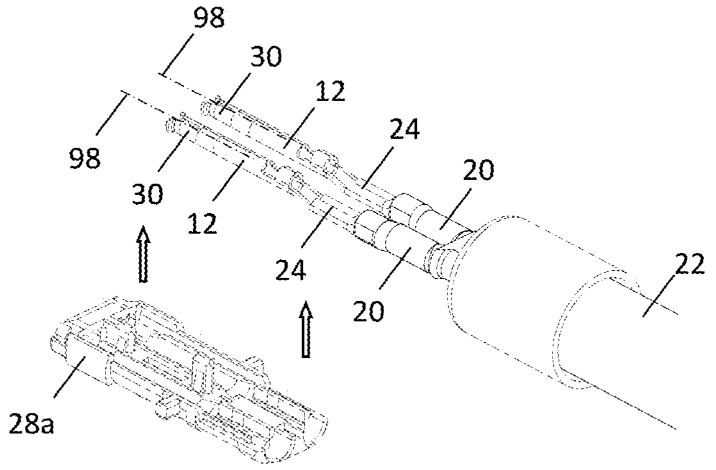
FIG. 21A is a first step of mounting a first insulating element to inner signal contacts according to an embodiment.
Figure 21B:
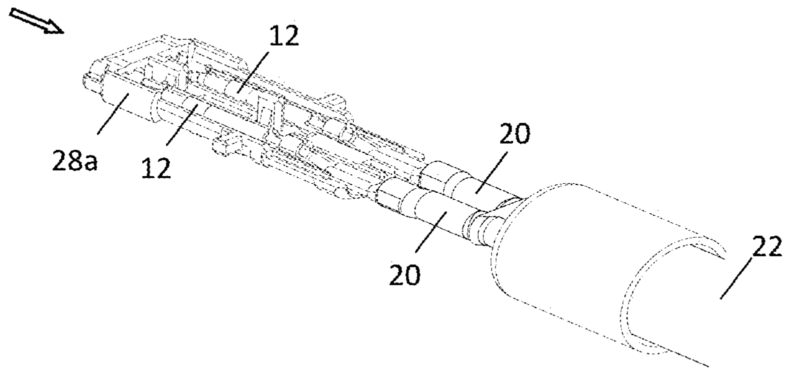
FIG. 21B is a second step of mounting the first insulating element to the inner signal contacts according to an embodiment.
Figure 21C:
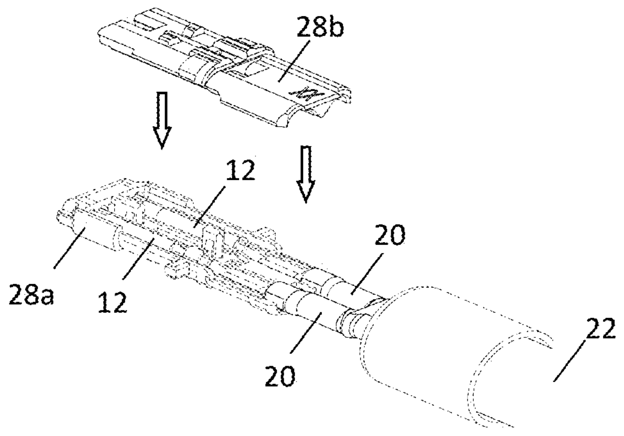
FIG. 21C illustrates a step of mounting a second insulating element to the assembly of the first insulating element and the inner signal contacts according to an embodiment.

FIGS. 21A and 21B depict a process of assembling a connector assembly 110 having an insulating element 28 as described in connection with FIGS. 14A to 14C. First, conductors 21 of a cable 22 are connected to the inner signal contacts 12 by attaching the wire insulations 20 to the inner signal contacts 12 by means of a termination element 24, for example, crimping wings. A first insulating element 28_a_ is then radially mounted to the inner signal contacts 12 such that the inner signal contacts 12 are embedded in cavities 32 of the first insulating element 28_a_. Once the inner signal contacts 12 are arranged in the cavities 32, the first insulation part 28_a_ is axially slid into position along the inner signal contacts 12 in a direction of the center axes 98 defined by the inner signal contacts 12 (FIG. 21B). By sliding the first insulating element 28_a_ in the direction of the center axes 98, funnel-shaped end sections 30 of the inner signal contacts 12 are optionally widened by means of ribs 46, if ribs 46 are arranged in a front opening 40 of the first insulation part 28_a_, as described above. Subsequently, a second insulating element 28_b_ is radially mounted to the inner signal contacts 12 and secured to the first insulating element 28_a_ (FIG. 21C) as described above.

Figure 22A:
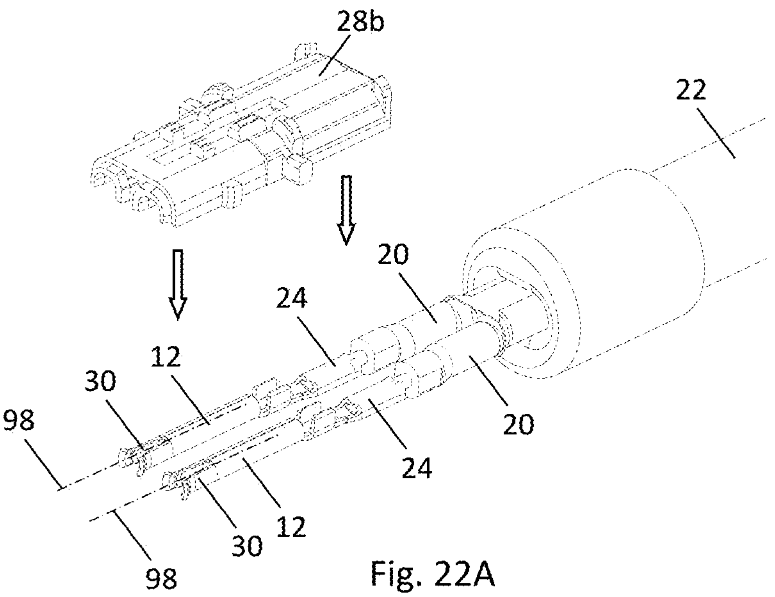
FIG. 22A illustrates a step of mounting a second insulating element to inner signal contacts according to an embodiment.
Figure 22B:
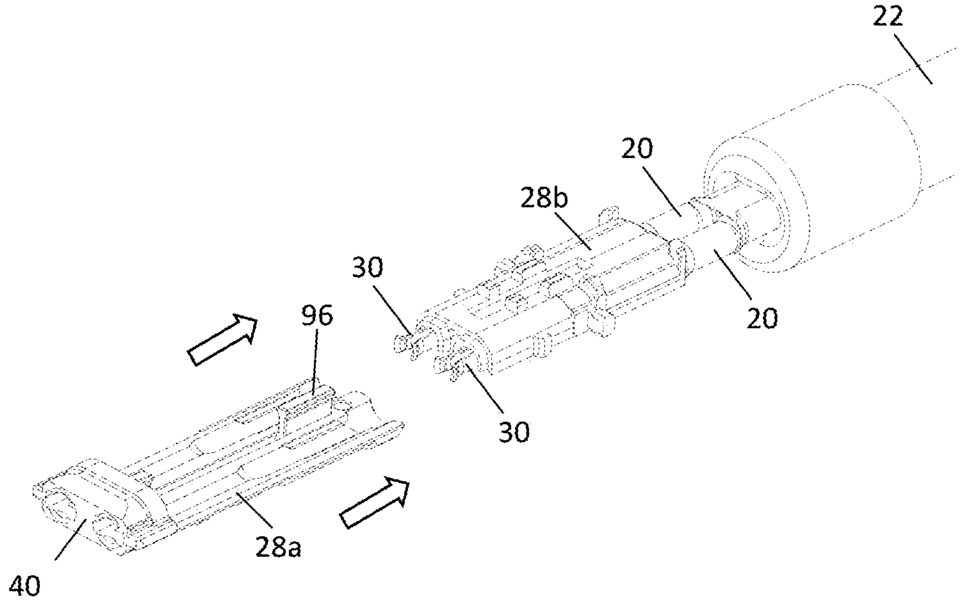
FIG. 22B illustrates a step of mounting a first insulating element to the assembly of the second insulating element and the inner signal contacts according to an embodiment.

FIGS. 22A and 22B depict an alternative process of assembling a connector assembly 110 as described herein. First, conductors 21 of a cable 22 are connected to the inner signal contacts 12 by attaching the wire insulations 20 to the inner signal contacts 12 by means of a termination element 24, for example crimping wings. A second insulating element 28_b_ is then radially mounted to the inner signal contacts 12 such that the inner signal contacts 12 are embedded in cavities 32 of the second insulating element 28_b_ (FIG. 22A). Once the inner signal contacts 12 are secured in the second insulating element 28_b_ as described above, a first insulating element 28_a_ is mounted to the second insulating element 28_b_, as shown in FIG. 22B. The first insulation part 28_a_ is axially slid onto the inner signal contacts 12 in a direction of the center axes 98 defined by the inner signal contacts 12. By sliding the first insulating element 28*a* in the direction of the center axes 98 of the inner signal contacts 12, funnel-shaped end sections 30 of the inner signal contacts 12 enter front openings 40 of the first insulating element 28*a* and are optionally widened by means of ribs 46, if ribs 46 are arranged in the front openings 40, as described above. The first insulating element 28*a* is secured to the second insulation part 28*b* by means as described above, for example, by means of tongues 96 and grooves 94.

Figure 23A:
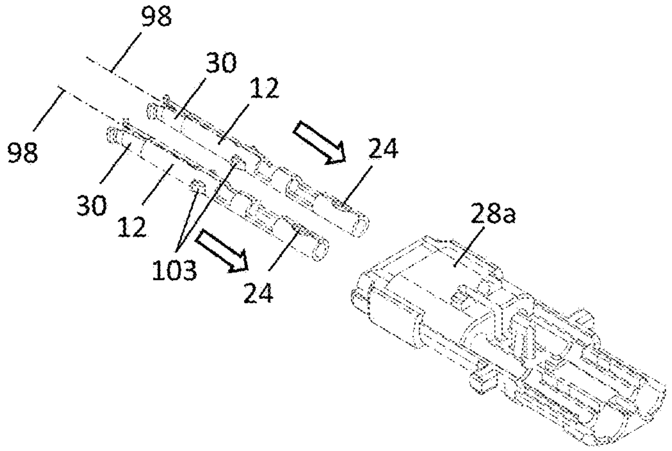
FIG. 23A illustrates a step of inserting inner signal contacts into a first insulating element according to an embodiment.
Figure 23B:
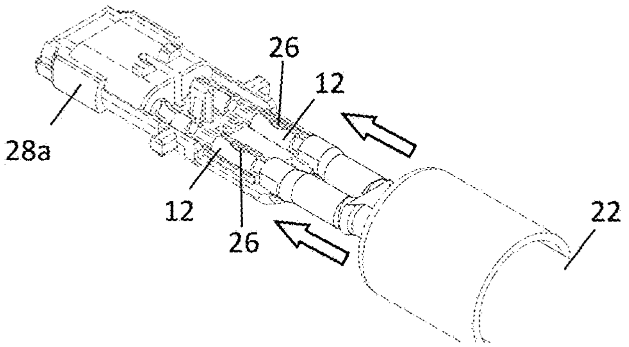
FIG. 23B illustrates a step of attaching wires to the inner signal contacts according to an embodiment.
Figure 23C:
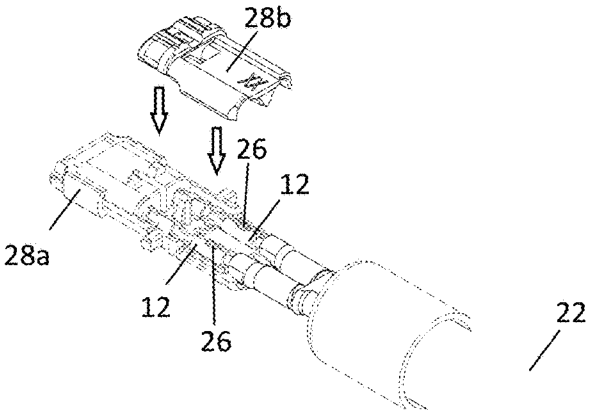
FIG. 23C illustrates a step of attaching a second insulating element to the assembly of the first insulating element and the inner signal contacts according to an embodiment.

FIGS. 23A to 23C depict another process of assembling a connector assembly 110, in particular for inner signal contacts 12 having welding openings 26 to connect the inner signal contacts 12 to conductors 21 of a cable 22 via welding, e.g., laser, ultrasonic or resistance welding. FIG. 23A shows a step of inserting inner signal contacts 12 into a first insulating element 28*a*. The inner signal contacts 12 are axially slid into cavities 32 of the first insulating element 28*a* in a direction of the center axes 98 defined by the inner signal contacts 12. Thus, the inner signal contacts 12 may be secured in the first insulating element 28*a* by features as described above, for example, by means of hooks 103. Once the inner signal contacts 12 are secured in the first insulating element 28*b*, a step of attaching conductors 21 of a cable 22 to the inner contacts 12 follows, as shown in FIG. 23B. The conductors 21 are connected to the inner signal contacts 12 via laser welding or ultrasonic welding or resistance welding in the welding openings 26. Subsequently, a second insulating element 28*b* is attached to the first insulating element 28*a* (FIG. 23C). More specifically, the second insulating element 28*b* is radially mounted to the inner signal contacts 12 and the first insulating element 28*a*. Therein, the second insulation part 28*b* is secured to the first insulating element 28*a* by means as described above.

Figure 24:
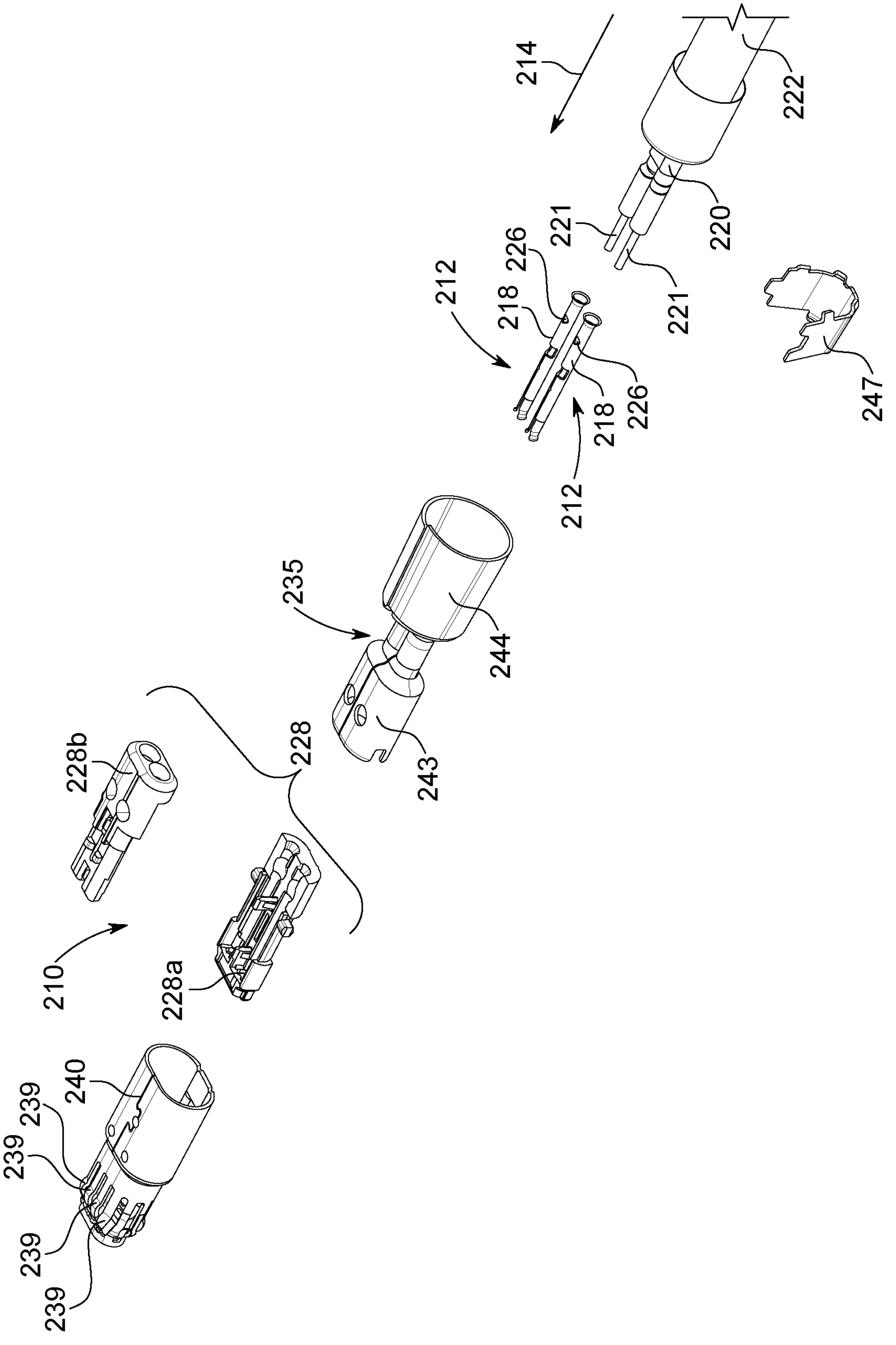
FIG. 24 is an exploded view of a cable assembly according to an embodiment of the present disclosure according to an embodiment.

FIG. 24 depicts an exploded view of a cable assembly according to an embodiment of the present disclosure. The cable assembly includes two elongated inner signal contacts 212 arranged generally parallel to each other along an axial direction 214. The inner signal contacts 212 have a tube-like connection portion 218 for connecting the inner signal contacts 212 to respective conductors 221 of a cable 222. In the present example, the conductors 221 are formed from strands, although other types of conductors 221 are generally conceivable. The conductors 221 are embedded in a wire insulation 220. The tube-like connection portion 218 of the inner signal contact 212 includes a first welding opening 226. The first welding opening 226 may be used to connect the inner signal contacts 212 to respective conductors 221 of the cable 222 via laser welding or ultrasonic welding. Alternatively, resistance welding can be used to connect the signal contacts 212 to respective conductors 221 of the cable 222.

The inner signal contacts 212 are arranged in an insulating element 228 which may form a di-electric housing. The insulating element 228 includes two separate insulating parts, a first insulating element 228*a* and a second insulating element 228*b*, which together completely surround the inner signal contacts 212. The first insulating element 228*a* and the second insulating element 228*b* may be attached to each other, for example, by a click-on connection, i.e., by a snap fit engagement. It is to be understood that the first insulating element 228*a* and the second insulating element 228*b* may be attached to each other by other suitable connections, as described herein.

In an assembled state of a connector assembly 210, a portion of the insulating element 228 may be arranged in a first connection end portion 243 of a first outer shielding contact 235. The cable 222 may be arranged in a second connection end portion 244 of the first outer shielding contact 235. The second connection end portion 244 of the first outer shielding contact 235 is configured to connect the first outer shielding contact 235 to the cable 222 mechanically and electrically. The first outer shielding contact 235 surrounds the inner signal contacts 212 and the insulating element 228 to provide a shield against interfering signals. However, the first outer shielding contact 235 may also be used as an electrical conductor to transport electric power. The first connection end portion 243 of the first outer shielding contact 235 may be received by a second outer shielding contact 240 including multiple shielding contacts 239. Furthermore, the cable assembly may include an inner crimp ferrule 247 which is placed around the cable 222.

Figure 25:
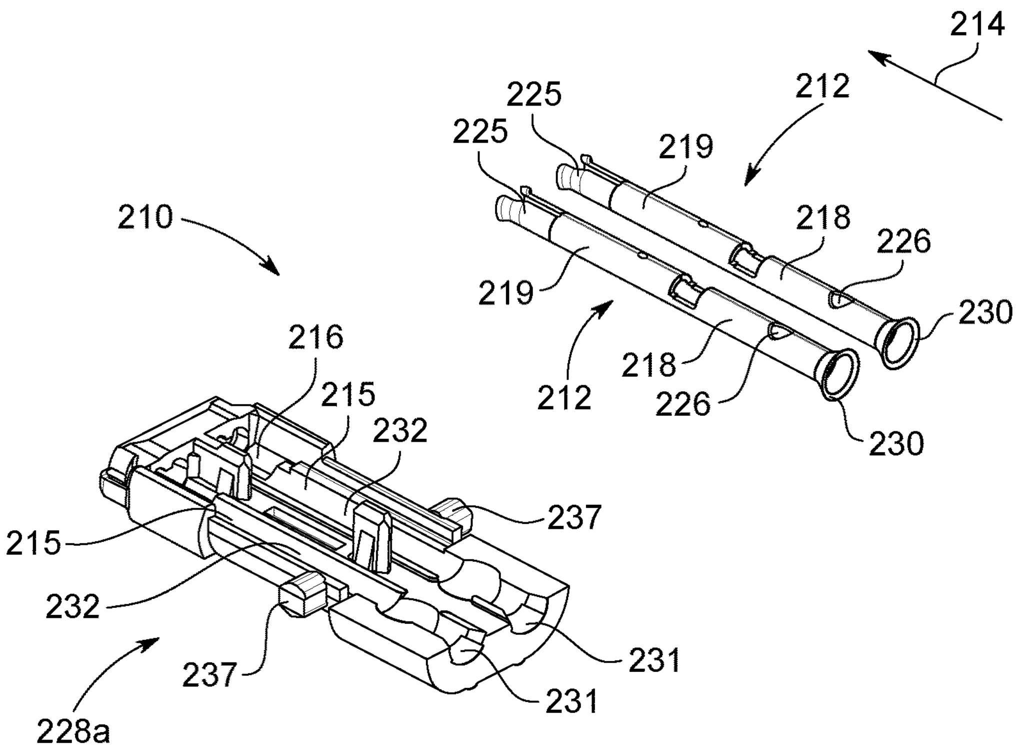
FIG. 25 is an exploded view of a part of a connector assembly of the cable assembly of FIG. 24 according to an embodiment.

FIG. 25 depicts an exploded view of a part of the connector assembly 210. The inner signal contacts 212 each include a funnel-shaped reception section 230 at one axial end of the tube-like connection portion 218. The funnel-shaped reception section 230 is received by a depression 231 arranged at one end of the first insulating element 228*a* and the second insulating element 228*b* (not shown in FIG. 25), respectively. The funnel-shaped reception section 230 may be an interference feature that is shaped complimentary to the depression 231 in order to hold the inner signal contacts 212 in position. Each of the elongated inner signal contacts 212 is accommodated in an elongated cavity 232 of the first insulating element 228*a*. A first part 215 of the cavity 232 is designed to generally form fittingly receive a tube-like main section 219 of the inner signal contact 212, i.e. a cross-sectional dimension of the first part 215 of the cavity 232 is generally equal to the outer cross-sectional dimension of the tube-like main section 219 of the inner signal contact 212, and a second part 216 of the cavity 232 makes room for the funnel-shaped end section 225 of the inner signal contact 212. In other words, a cross-sectional dimension D (see FIG. 4A) of the first part 215 of the cavity 232, also referred to as a minimum cross-sectional dimension D of the cavity 232, corresponds to the outer cross-sectional dimension of the tube-like main section 219, whereas a cross-sectional dimension of the second part 216 of the cavity 232, also referred to as a maximum cross-sectional dimension of the cavity 232, is at least equal to or greater than the maximum outer cross-sectional dimension C of the funnel-shaped end section 225 of the inner signal contact 212. Since the maximum outer cross-sectional dimension C of the funnel-shaped end section 225 is greater than the maximum outer cross-sectional dimension of the tube-like main section 219, the maximum outer cross-sectional dimension C of the flaring funnel-shaped end section 225 is also greater than the cross-sectional dimension D of the first part 215 of the cavity 232, i.e., the minimum cross-sectional dimension D of the cavity 232. It is to be understood that the dimensions described herein may be diameters if the tube-like main section 219 and the cavity 232 are of circular cross-section (see FIG. 4A).

The first insulating element 228*a* may fulfill the task of locking the signal contacts 212 in the axial direction 214 so that the inner signal contacts 212 maintain their axial position when the connector assembly 210 is connected to a mating connector. It is to be understood that, additionally or alternatively, the second insulating element 228*b* may also fulfill the task of locking the signal contacts 212 in the axial direction 214.

Figure 26A:
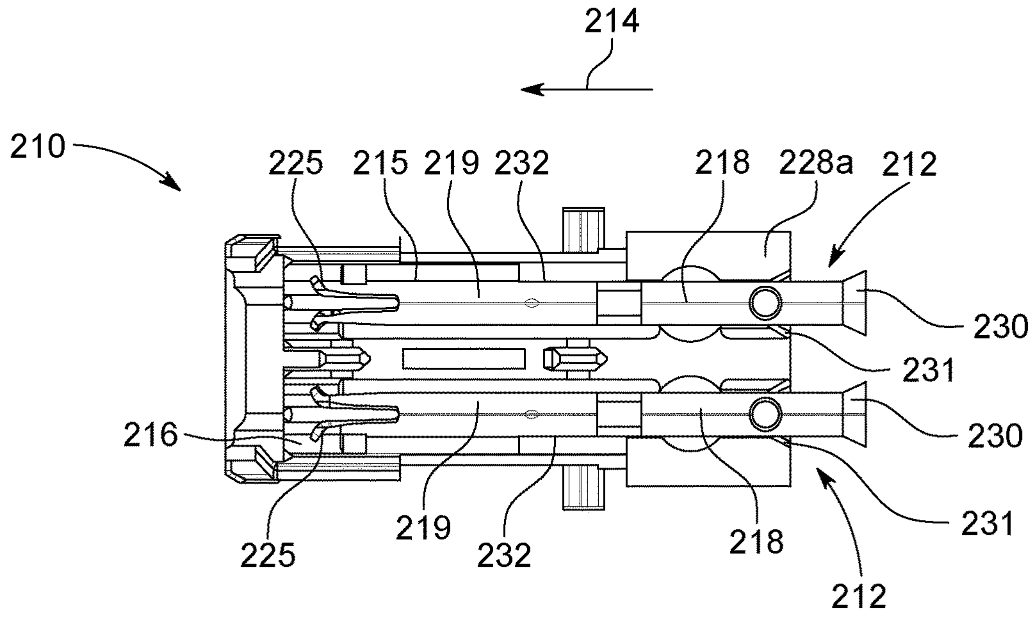
FIG. 26A illustrates a step of placing inner signal contacts into a first insulating element in a preliminary position according to an embodiment.
Figure 26B:
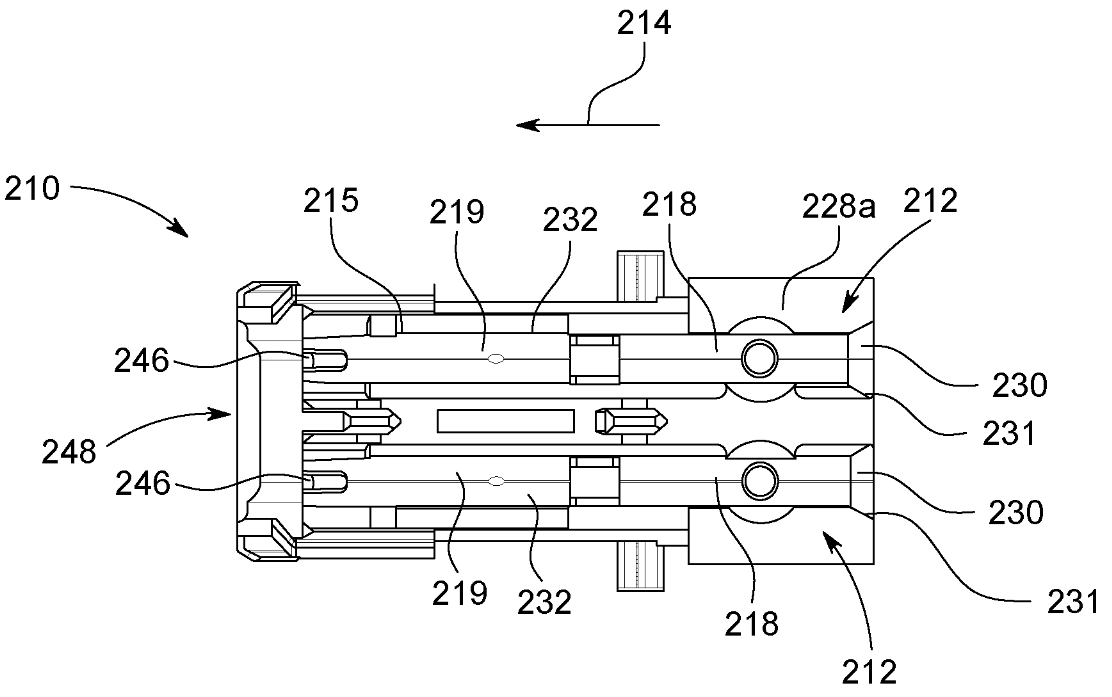
FIG. 26B illustrates a step of sliding inner signal contacts along the first insulating element into an end position according to an embodiment.

FIG. 26A to FIG. 28 depict a process of assembling the connector assembly 210 of FIG. 24. FIG. 26A shows a step of placing inner signal contacts 212 into cavities 232 of a first insulating element 228*a* of the insulating element 228.

More specifically, the inner signal contacts 212 are placed, for example in a radial direction, into the first insulating element 228*a* so as to adopt a preliminary position in the cavities 232. The tube-like main section 219 of each inner signal contact 212 is form fittingly received in a first part 215 of the cavity 232. The funnel-shaped end section 225 of each inner signal contact 212 is received in a second part 216 of the cavity 232. In this preliminary position of the inner signal contacts 212 in the first insulating element 228*a*, the funnel-shaped reception section 230 at the axial end of the tube-like connection portion 218 opposite from the funnel-shaped end section 225 of each inner signal contact 212 protrudes from the end of the first insulating element 228*a* where the depression 231 is arranged.

Once the inner signal contacts 212 are arranged in the cavities 232, the inner signal contacts 212 are slid in an axial direction 214 along the first insulating element 228*a* into an end position (see FIG. 26B) in which the funnel-shaped reception section 230 of each inner signal contact 212 is form fittingly received in its corresponding depression 231 of the first insulating element 228*a*. Also, by sliding the inner signal contacts 212 in the axial direction 214, the funnel-shaped end sections 225 (see FIG. 26A) of the inner signal contacts 212 may be widened by means of ribs 246, if ribs 246 are arranged in a front opening 248 of the first insulating element 228*a* (see also FIGS. 6A to 7D).

Figure 26C:
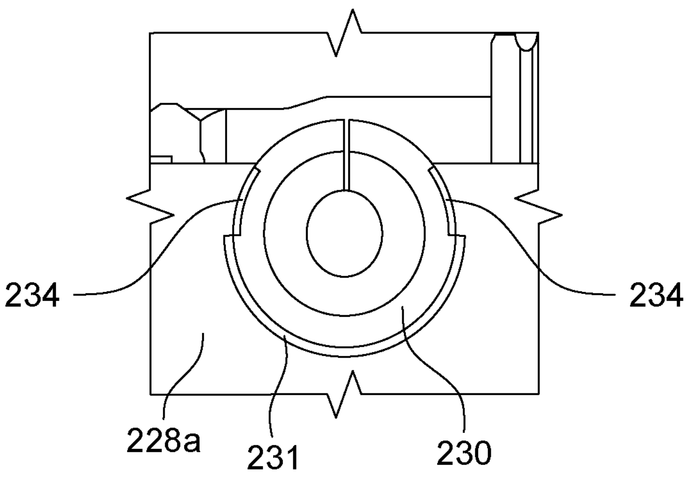
FIG. 26C is a front view of a reception section according to an embodiment.

FIG. 26C depicts a frontal view of the reception section 230. After sliding the inner signal contacts 212 in the axial direction 214, the funnel-shaped reception section 230 of each inner signal contact 212 is form fittingly received in its corresponding depression 231 of the first insulating element 228*a*. More specifically, the first insulating element 228*a* and the reception section 230 of the signal contact 212 are in contact with each other in an interference region 234. In this interference region 234, the relatively softer material of the first insulating element 228*a* gets pushed aside and, thus, is deformed by the reception section 230, this deformation generating a retention force holding the signal contact 212 in place. With time, the deformed material of the first insulating element 228*a* will relax and the retention force decrease, but then the second insulating element 228*b* (shown in FIG. 29) will have been mounted to the first insulation element 228*a*, thereby fully enclosing and fixing the reception section 230 within the insulating element 228.

Figure 27:
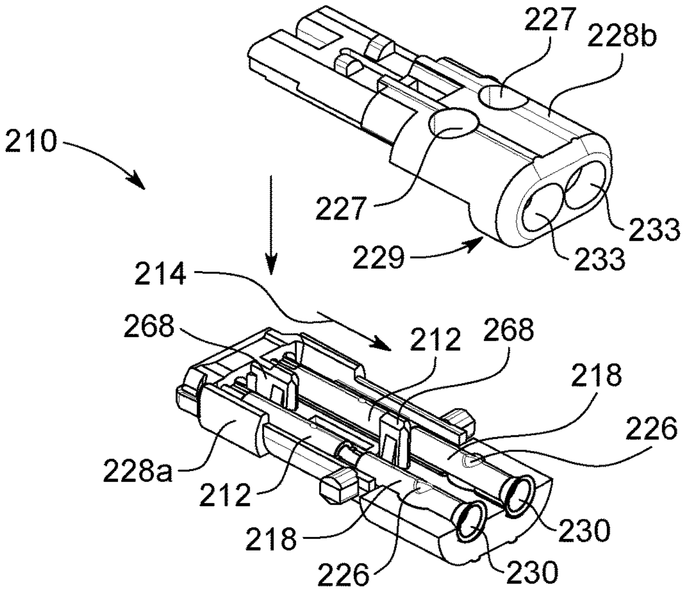
FIG. 27 illustrate a step of pinching a second insulating element to an assembly of the first insulating element and the inner signal contacts according to an embodiment.

FIG. 27 depicts a step of pinching a second insulating element 228*b* to an assembly of the first insulating element 228*a* and the inner signal contacts 212. After the inner signal contacts 212 have been brought into their end position in the first insulating element 228*a*, the second insulating element 228*b* is pinched, for example radially, onto the first insulating element 228*a*. The first insulating element 228*a* and the second insulating element 228*b* may be fixed together using press fit elements 268, as described above for FIGS. 13A to 14D. It is to be understood that the first insulating element 228*a* and the second insulating element 228*b* may be fixed together by other means, for example as described above for FIGS. 15A to 18E.

The second insulating element 228*b* has an end cap 229 which includes a funnel-shaped connection opening 233 for each inner signal contact 212, i.e., two funnel-shaped connection openings 233 in the present example. The end cap 229 may fix the inner signal contacts 212 against movement in the axial direction 214. Each of the two funnel-shaped connection openings 233 of the end cap 229 is associated with a respective reception section 230 of the inner signal contacts 212. The funnel-shaped connection openings 233 of the end cap 229 and the respective reception section 230 of the inner signal contacts 212 are aligned in an assembled state of the connector assembly 210, i.e., when the second insulating element 228*b* is pinched onto the first insulating element 228*a*.

Figure 28:
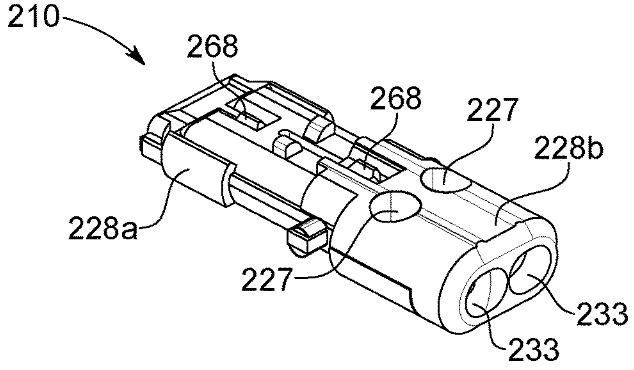
FIG. 28 is an isometric view of the connector assembly of FIG. 24 in an assembled state according to an embodiment.

The inner signal contacts 212, in particular the tube-like connection portions 218 of the inner signal contacts 212, each include a welding opening 226, also referred to as a first welding opening 226. Likewise, the second insulating element 228*b* of the insulating element 228 includes at least one welding opening 227, also referred to as a second welding opening 227. It is to be understood that, additionally or alternatively, the first insulating element 228*a* of the insulating element 228 may include at least one welding opening 227 (see FIG. 29). In the embodiment shown in FIG. 27, the second insulating element 228*b* includes two welding openings 227, each associated with a respective first welding opening 226 of the inner signal contacts 212. Each of the first welding openings 226 of the inner signal contacts 212 and the respective second welding opening 227 of the second insulating element 228*b* are aligned in an assembled state of the connector assembly 210, i.e., when the second insulating element 228*b* is pinched onto the first insulating element 228*a*. The assembled state of the connector assembly 210 is shown in FIG. 28.

Figure 29:
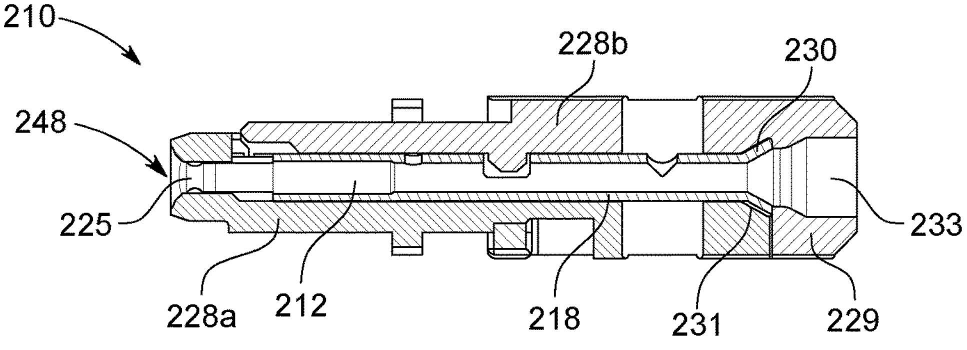
FIG. 29 is a cross-sectional side view of the connector assembly according to an embodiment.

FIG. 29 depicts a cross-sectional side view of the connector assembly 210. The inner signal contact 212 is completely surrounded by the first insulating element 228*a* and the second insulating element 228*b*, wherein the funnel-shaped end section 225 of the inner signal contact 212 is arranged in a front opening 248 of the first insulating element 228*a*. The funnel-shaped reception section 230 of the elongated inner signal contact 212 is arranged in the depression 231 defined by the first and second insulating elements 228*a*, 228*b*. Thereby, the inner signal contact 212 is fixed against movement in the axial direction 214. The funnel-shaped connection opening 233 at the end cap 229 of the second insulating element 228*b* and the funnel-shaped reception section 230 of the inner signal contact 212 are aligned. The funnel-shaped connection opening 233 and the funnel-shaped reception section 230 may facilitate an insertion of a conductor (see FIG. 35A) into the tube-like connection portion 218 of the elongated inner signal contact 212.

Figure 30A:
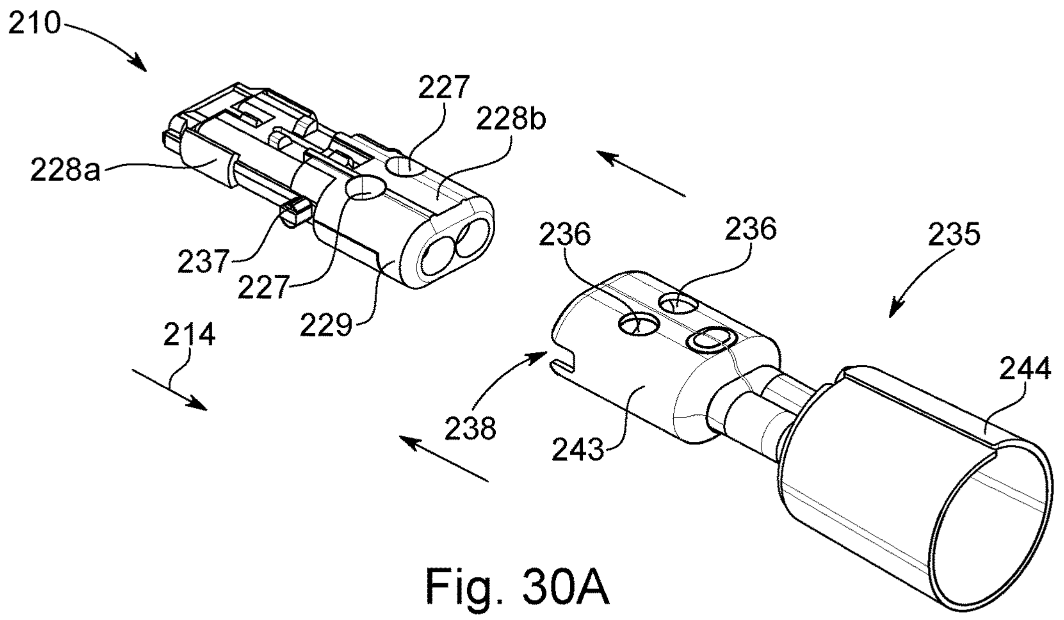
FIG. 30A illustrates a step of sliding a first outer shielding contact onto the connector assembly according to an embodiment.

FIG. 30A depicts a step of sliding a first outer shielding contact 235 onto the connector assembly 210. The first outer shielding contact 235 has at least one welding opening 236, also referred to as a third welding opening 236. The at least one third welding opening 236 is located at a first connection end portion 243 of the first outer shielding contact 235. In the embodiment shown in FIG. 30A, the first outer shielding contact 235 includes two welding openings 236, each of which is associated with a respective second welding opening 227 of the second insulating element 228*b*.

Figure 30B:
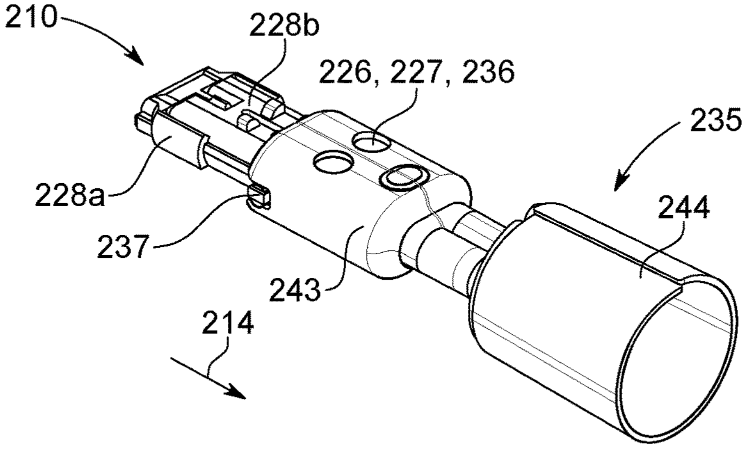
FIG. 30B is an isometric view of the connector assembly with the first outer shielding contact in an assembled state according to an embodiment.

FIG. 30B depicts an isometric view of the connector assembly 210 with the first outer shielding contact 235 in an assembled state. The first welding openings 226 of the inner signal contacts 212, the respective second welding openings 227 of the second insulating element 228*b* and the respective third welding openings 236 of the first outer shielding contact 235 are aligned in the assembled state of the connector assembly 210.

The first outer shielding contact 235 further includes the second connection end portion 244 of the first outer shielding contact 235 to fix a cable 222 (not shown in FIG. 30B) to the first outer shielding contact 235, as will be described further below.

The first insulating element 228*a* further includes at least one press fit spike 237, in particular two opposite arranged press fit spikes 237 which protrude from the first insulating element 228*a* perpendicularly to the axial direction 214. The press fit spikes 237 are configured to secure the insulating element 228 to the first connection end portion 243 of the first outer shielding contact 235. To this end, the first outer shielding contact 235 defines at least one gap 238 at the first connection end portion 243 configured to receive the at least one press fit spike 237 of the first insulating element 228*a*, in the present example two U-shaped gaps 238 located on opposite sides of the first connection end portion 243 of the first outer shielding contact 235. The first connection end portion 243 of the first outer shielding contact 235 is slid onto the insulating element 228 in the axial direction 214, in particular onto the end cap 229 of the second insulating element 228*b* of the insulating element 228 such that each of the press fit spikes 237 is completely received in a press fit manner by the respective gap 238 on the first connection end portion 243 of the first outer shielding contact 235.

Figure 31:
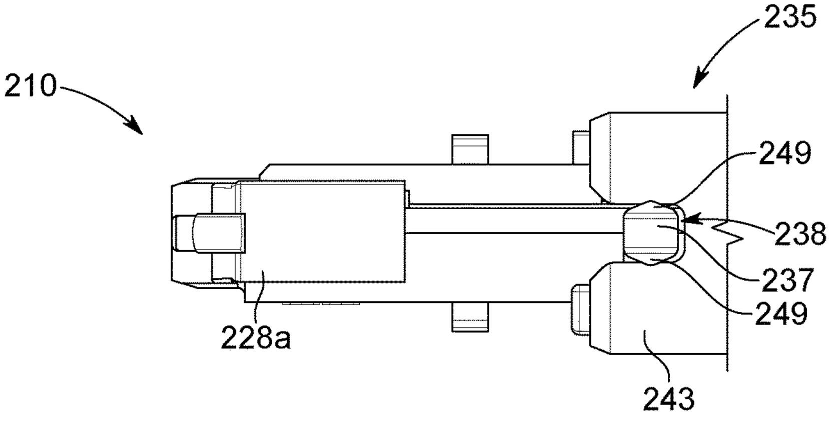
FIG. 31 is a side view of the connector assembly including the first outer shielding contact in the assembled state according to an embodiment.

FIG. 31 depicts a side view of the connector assembly 210 with the outer shielding contact 235 in the assembled state. The press fit spikes 237 may be formed as cuboidal elements having protrusions 249 that protrude over the surfaces of the cuboidal elements. The gaps 238 of the first outer shielding contact 235 may be formed as U-shaped recesses configured to receive the press fit spikes 237 of the first insulating element 228*a*. A cross-sectional dimension of the gaps 238 may be substantially the same as a cross-sectional dimension of the corresponding press fit spike 237 (the protrusions 249 not considered). When the insulating element 228 and the first connection end portion 243 of the first outer shielding contact 235 are assembled, the press fit spikes 237 are inserted into the corresponding cuboidal recesses or gaps 238 of the first outer shielding contact 235. The press fit spikes 237 are secured in the gaps 238 by means of the protrusions 249. More specifically, the press fit spikes 237 have to be pressed into the gaps 238 since the protrusions 249 lead to a cross-sectional dimension of the press fit spikes 237 greater than that of the gaps 238.

Figure 32A:
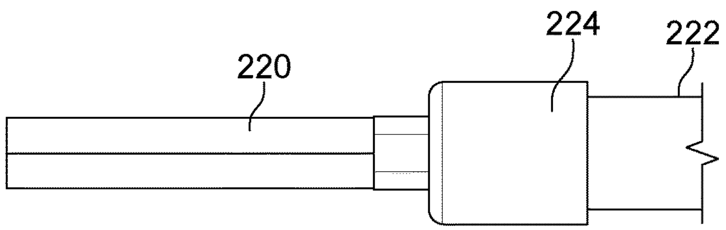
FIGS. 32A to 32D are steps of wire conditioning of a cable according to an embodiment.
Figure 32B:
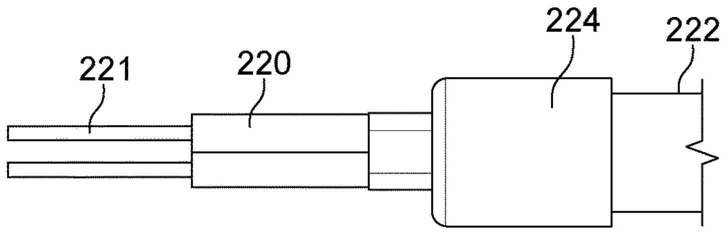
Figure 32C:
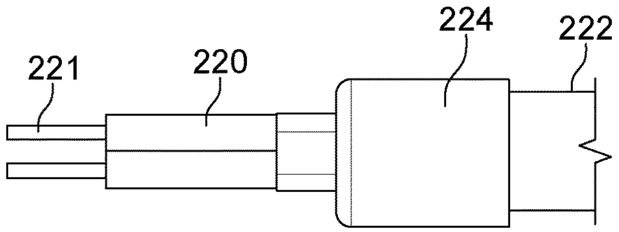
Figure 32D:
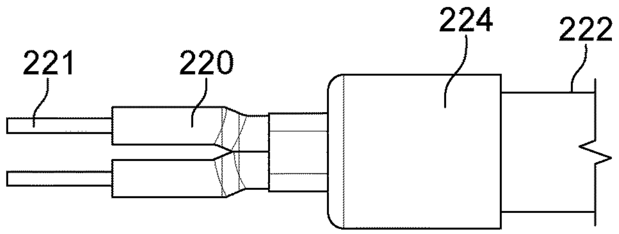

FIGS. 32A to 32D depict steps of wire conditioning after a trimmed cable braid 224 of the cable 222 has been back folded over a crimped ferrule 247 (see FIG. 24). The cable 222 may include two twisted wires which are covered by a wire insulation 220. In a first step, the wires are untwisted and flattened (FIG. 32A). In a next step, the wire insulation 220 is removed from end sections of the wires in order to strip end sections of the wire conductors 221 (FIG. 32B), while the wire insulation 220 may still cover a part of the wires adjacent to the crimped ferrule 247 (not shown in FIGS. 32A-D). As mentioned before, the conductors 221 may be formed from strands. In a next step, the stripped ends of the conductors 221 are zero cut, for example, with heat to melt the strand ends to each other (FIG. 32C). In a next step, the wires are preformed into a U-shape (FIG. 32D). In a final step, the stripped wire conductors 221 are soldered or resistance-welded into solid conductor ends.

Figure 33A:
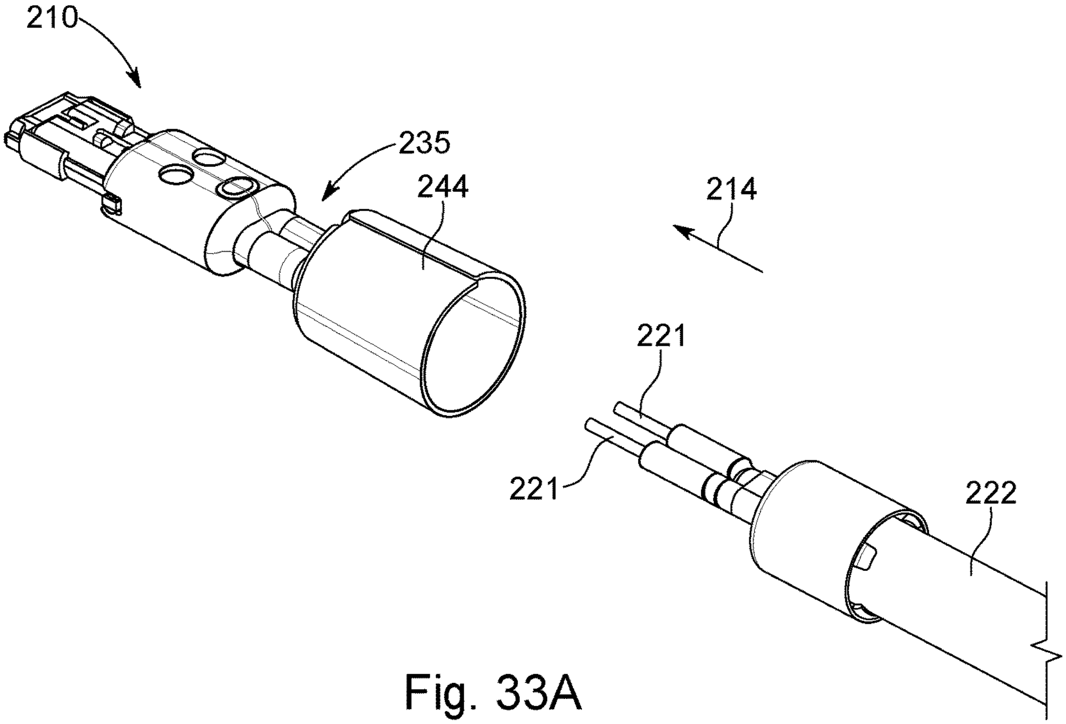
FIGS. 33A and 33B are steps of mounting the cable to the connector assembly according to an embodiment.
Figure 33B:
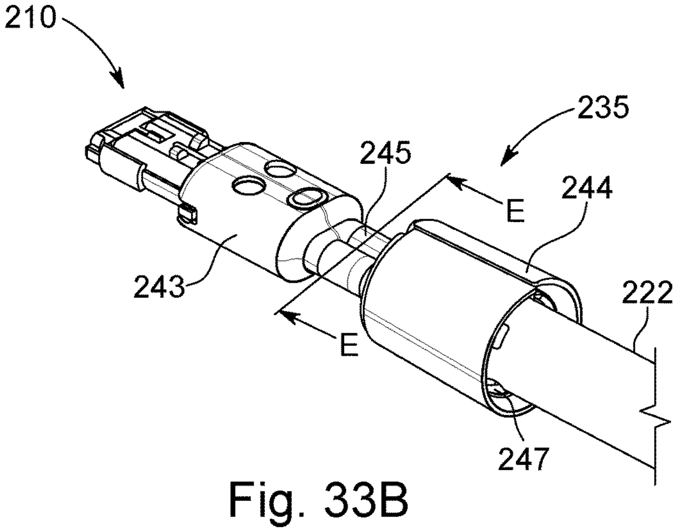

FIGS. 33A and 33B show the mounting of the cable 222 to the pre-assembled connector assembly 210. In FIG. 33A, the cable 222 is inserted in the axial direction 214 into the second connection end portion 244 of the first outer shielding contact 235, such that each of the stripped ends of the conductors 221 is inserted into a respective one of the tube-like connection portions 218 of the elongated inner signal contacts 212 (see also FIG. 35B). FIG. 33B shows a final position of the cable 222 in the second connection end portion 244 of the first outer shielding contact 235, in which the inner crimp ferrule 247 of the cable 222 is completely surrounded by the second connection end portion 244 of the first outer shielding contact 235.

The first outer shielding contact 235 includes a middle connection part 245 located between the first connection end portion 243 and the second connection end portion 244 of the first outer shielding contact 235. The middle connection part 245 is configured to receive the conductors 221 (see FIG. 33A) of the cable 222 when the cable 222 is inserted into the second connection end portion 244 of the first outer shielding contact 235.

Figure 34:
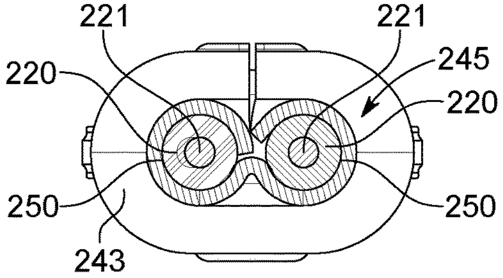
FIG. 34 is a cross-sectional view of a middle connection part of the first outer shielding contact according to an embodiment.

FIG. 34 shows a cross-sectional view of the middle connection part 245 along a sectional plane E-E of FIG. 33B of the first outer shielding contact 235. The middle connection part 245 defines two tunnels 250, one for each conductor 221, which serve to guide the stripped ends of the conductors 221 into the respective elongated inner signal contact 212 (not shown in FIG. 34) when the cable 222 is inserted into the connector assembly 210 (FIGS. 35A and 35B).

Figure 35A:
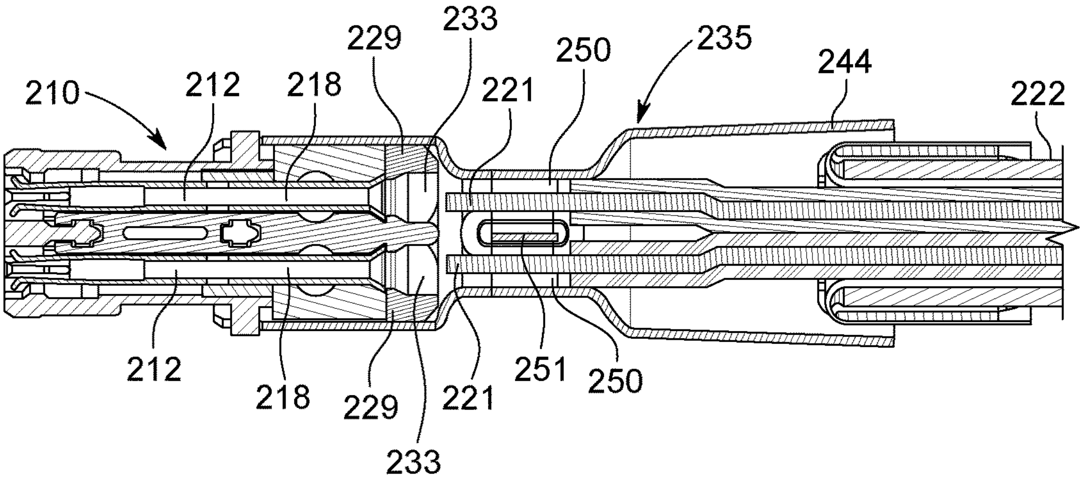
FIGS. 35A to 35C are cross-sectional views of the connector assembly according to an embodiment.
Figure 35B:
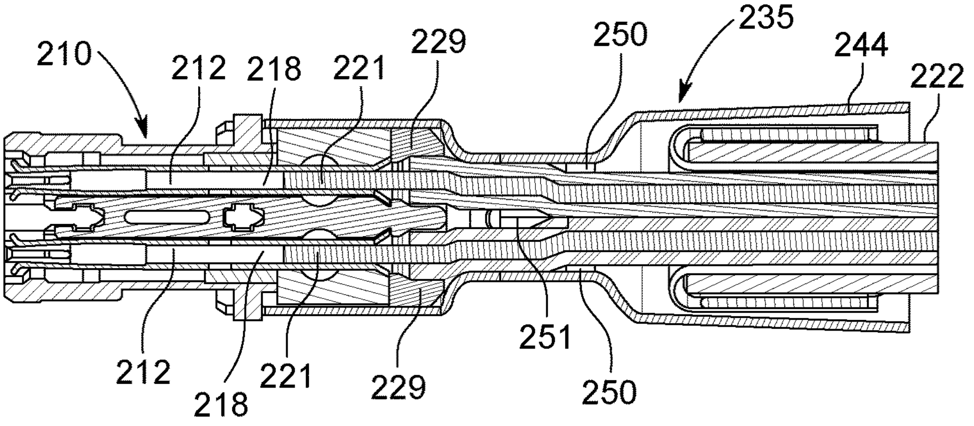
Figure 35C:
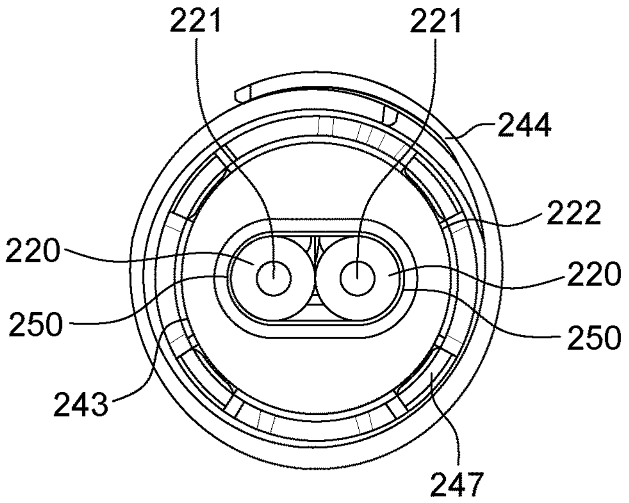

FIGS. 35A to 35C show cross-sectional views of the connector assembly 210. The tunnels 250 are separated by a partition wall 251 which serves to align the conductors 221 with the respective connection opening 233 of the end cap 229 of the second insulating element 228*b* (not shown in FIG. 35A-35C). When the cable 222 is fully inserted, the cable 222 is fixed to the first outer shielding contact 235 by crimping the second connection end portion 244 of the first outer shielding contact 235 to the cable 222 (FIG. 35C), thereby increasing an overlapping of parts of the second connection end portion 244.

Figure 36A:
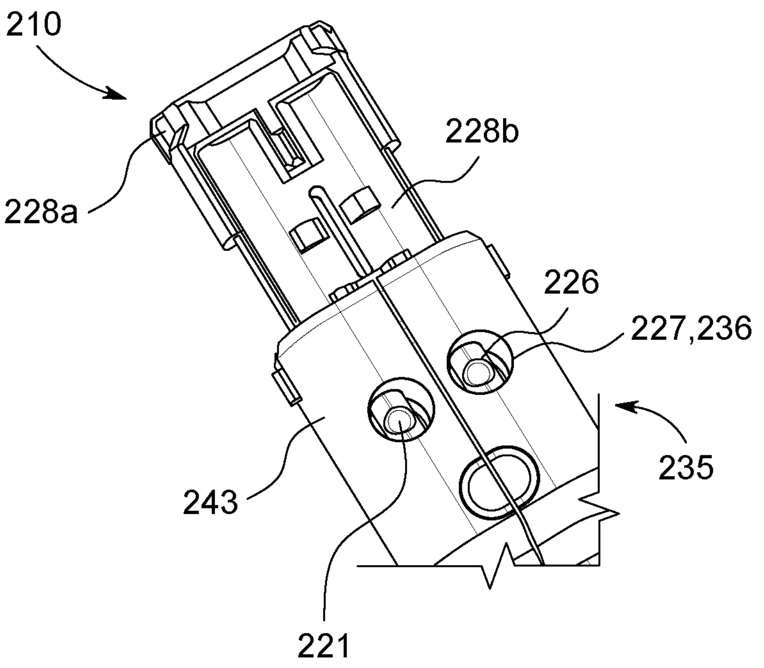
FIG. 36A is a top view of the connector assembly before welding according to an embodiment.
Figure 36B:
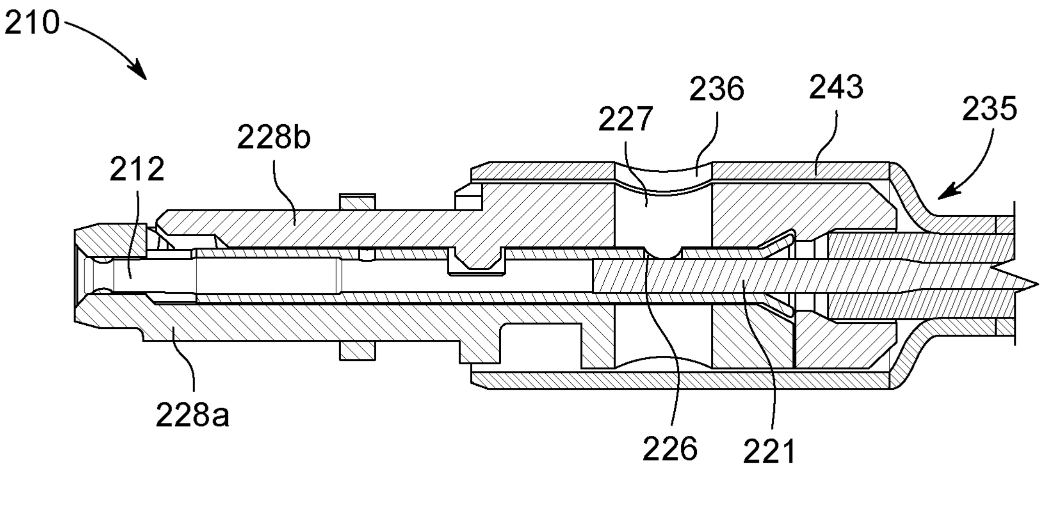
FIG. 36B is a cross-sectional side view of the connector assembly before welding according to an embodiment.

Furthermore, when the cable 222 is fully inserted, the stripped ends of the conductors 221 are positioned in the tube-like connection portion 218 such that they can be accessed through the aligned welding openings 226, 227, 236 of the inner signal contact 212, the second insulating element 228*b* and the first outer shielding contact 235 (FIGS. 27, 28, 30A). Thereby, the conductors 221 can be connected to the inner signal contacts 212 via laser welding through the first welding opening 226, the at least one second welding opening 227 and the at least one third welding opening 236, as shown in FIG. 36A. As a result of the welding (FIG. 36B), the first welding openings 226 of the inner signal contacts 212, the second welding openings 227 of the second insulating element 228*b* and the third welding openings 236 of the first outer shielding contact 235 are closed by a weld spot.

Figure 37A:
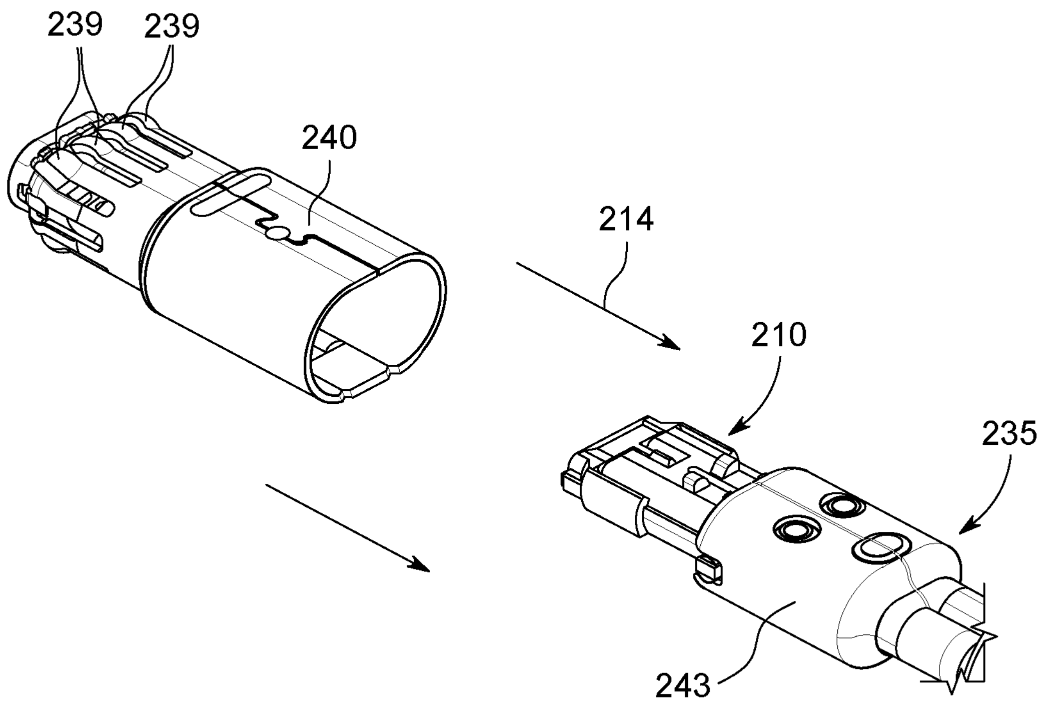
FIG. 37A illustrates a step of sliding a second outer shielding contact onto the connector assembly according to an embodiment.
Figure 37B:
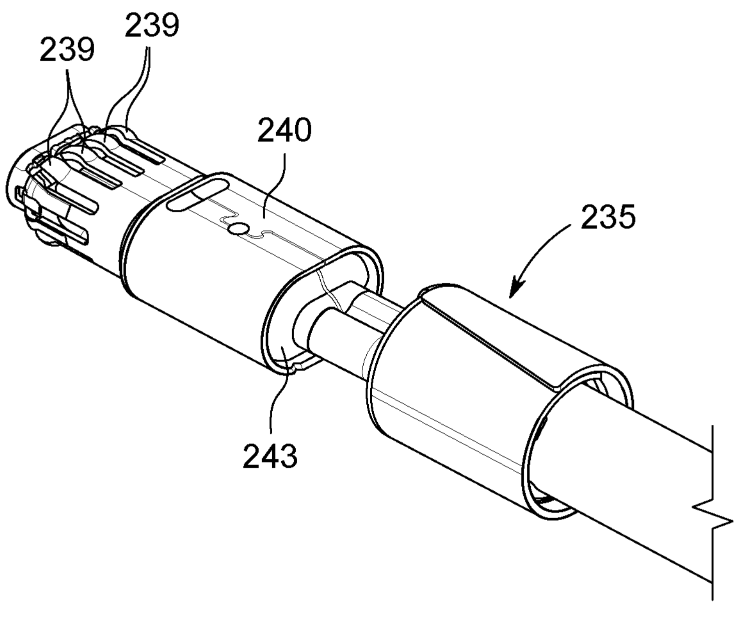
FIG. 37B is an isometric view of the connector assembly with the second outer shielding contact in an assembled state according to an embodiment.
Figure 38A:
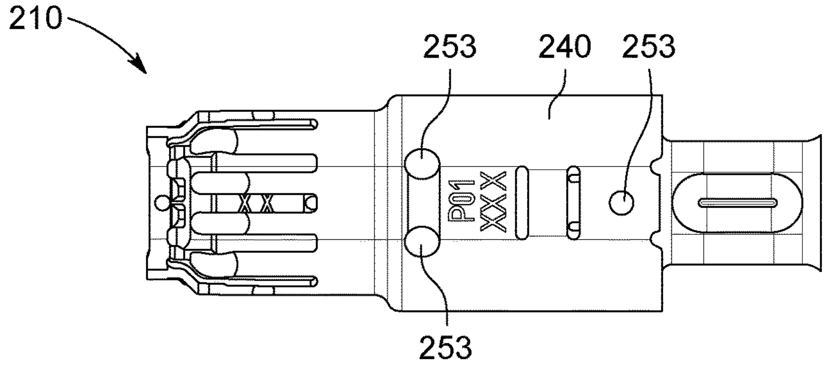
FIGS. 38A and 38B are a top view and a bottom view of the connector assembly in an assembled state according to an embodiment.
Figure 38B:
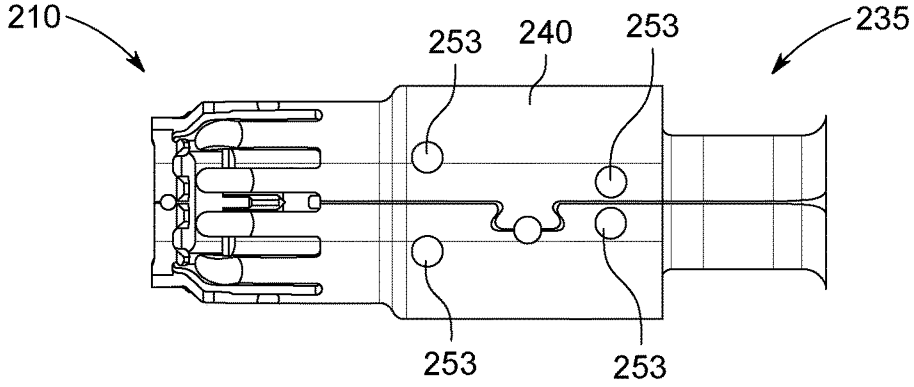

Thereafter, a second outer shielding contact 240 is slid onto the connector assembly 210 in an axial direction 214 (FIGS. 37A and 37B), such that it surrounds the first connection end portion 243 of the first outer shielding contact 235 in the assembled state. The second outer shielding contact 240 has a plurality of shielding contacts 239. As shown in FIGS. 38A and 38B, the second outer shielding contact 240 is fixed to the first outer shielding contact 235 via welding spots 253 by welding, for example by laser welding.

Figure 39:
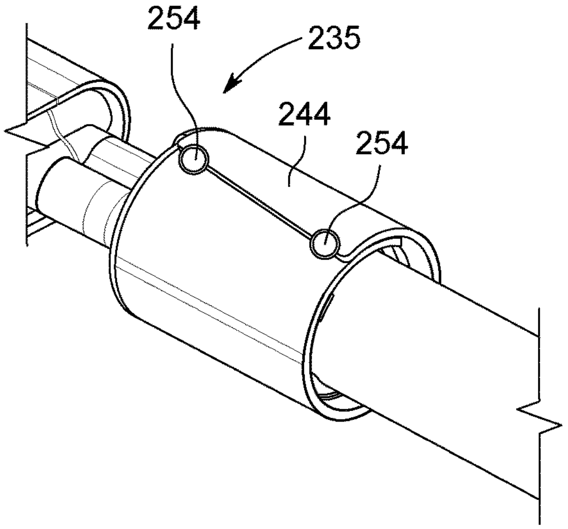
FIG. 39 is an isometric view of a secured crimped second connection end portion according to an embodiment.

As shown in FIG. 39, the crimped second connection end portion 244 of the first outer shielding contact 235 may also be secured via welding spots 254 by welding, for example by laser welding.

Figure 40:
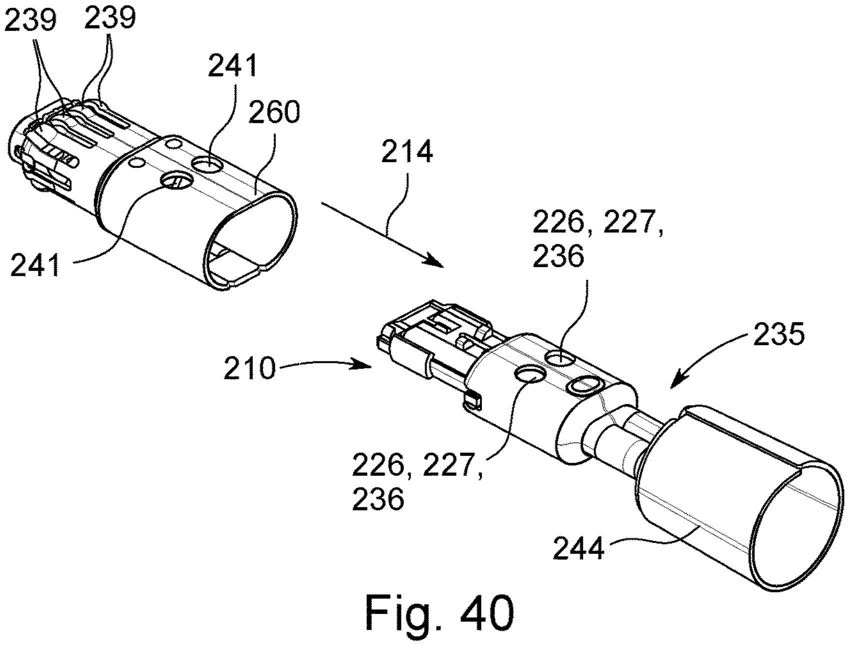
FIG. 40 illustrates a step of sliding an alternative embodiment of a second outer shielding contact onto the connector assembly according to an embodiment.
Figure 41:
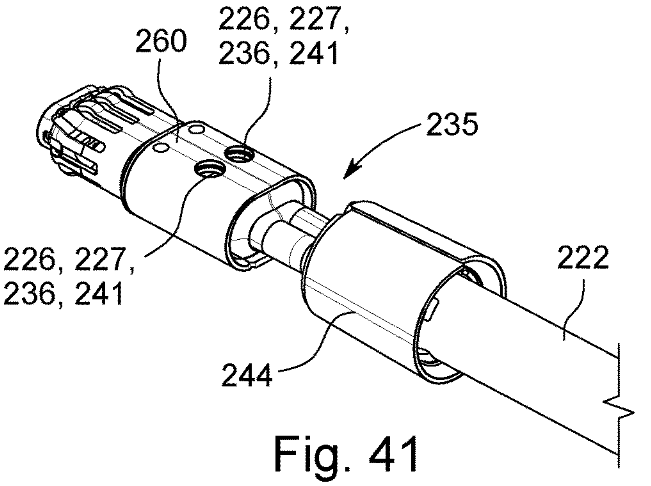
FIG. 41 is an isometric view of the connector assembly of FIG. 40 in an assembled state according to an embodiment.
Figure 42:
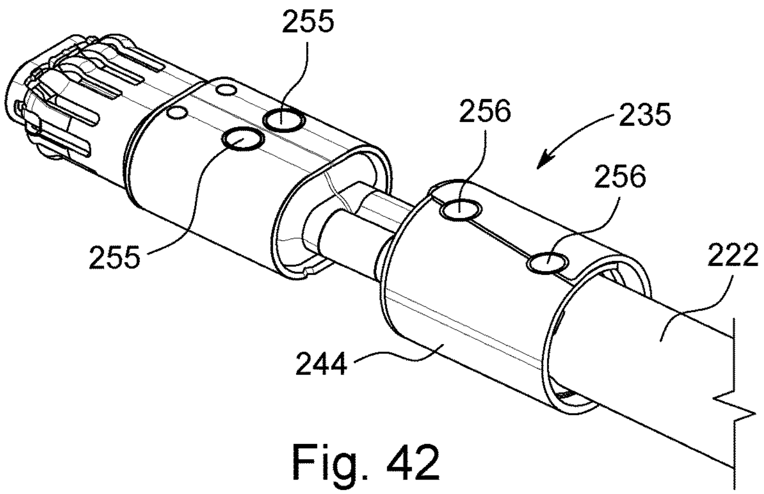
FIG. 42 is an isometric view of a secured crimped second connection end portion according to an embodiment.

FIGS. 40 to 42 show an alternative cable assembly sequence. The steps described above in connection with FIGS. 25 to 35C are generally the same for this alternative cable assembly sequence. However, in this alternative cable assembly sequence, an alternative second outer shielding contact 260 is slid onto the connector assembly 210 prior to inserting the cable 222 and welding (FIG. 40). This alternative second outer shielding contact 260 differs from the above described second outer shielding contact 240 in that it has at least one welding opening 241, also referred to as a fourth welding opening 241. In the present example, the alternative second outer shielding contact 260 has two welding openings 241, each one associated with a respective third welding opening 236 of the first outer shielding contact 235, such that, in the assembled state, the first to fourth welding openings 226, 227, 236 and 241 are aligned for each inner signal contact 212.

Alternatively, the second outer shielding contact 260 and the first outer shielding contact 235 can be pre-assembled prior to inserting the cable 222, such that the first to fourth welding openings 226, 227, 236 and 241 are aligned for each inner signal contact 212 in the pre-assembled state of the second outer shielding contact 260 and the first outer shielding contact 235.

Once the cable 222 has been fully inserted into the second connection end portion 244 of the first outer shielding contact 235 as described before (FIG. 41) and the second connection end portion 244 of the first outer shielding contact 235 has been crimped to the cable 222 and, optionally, secured via welding spots 256, each conductor 221 is connected to the respective inner signal contact 212 via laser welding through the respective first to fourth welding openings 226, 227, 236 and 241, as shown in FIG. 41. As a result of this welding process, the first to fourth welding openings 226, 227, 236 and 241 will be closed by weld spots 255 (FIG. 42).

The design of the connector assembly as described herein may eliminate safety relevant risks, such as a damaged interface during mating and electrical short circuits within the inner signal contacts 212 and/or in an application of a customer. Additionally, laser welding the conductors 221 to the inner signal contacts 212 may result in the best electrical and mechanical connection one can achieve. This kind of connection may allow a signal contact outer contour to be circular along a connection portion 218, for example a wire termination section. A circular outer contact contour may be an ideal form for data transmission. Furthermore, laser welding is contactless and as such may enable further miniaturization with more design freedom to optimize dimensions in favor of data transmission.

Finally, an overlapping second connection end portion 244 may be integrated to a one-piece first outer shielding contact 235 or rear outer contact design. The second connection end portion 244 may be used in order to avoid the risk of jamming and cutting a cable braid into loose and conductive and therefore nasty particles.

Figure 43:
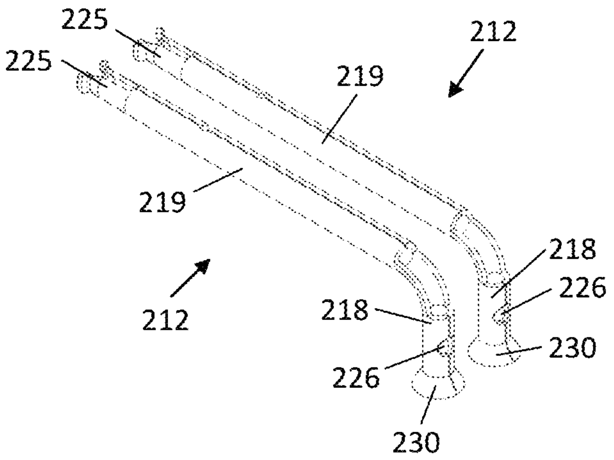
FIG. 43 is an isometric view of inner signal contacts according to a further embodiment of the present disclosure according to an embodiment.

FIG. 43 shows an isometric view of inner signal contacts 212 according to a further embodiment. Each of the inner signal contacts 212 includes a tube-like connection portion 218 and a tube-like main section 219. The tube-like connection portion 218 includes a funnel-shaped reception section 230 at one axial end of the tube-like connection portion 218. The funnel-shaped reception section 230 may be configured as described herein. The tube-like connection portion 218 may define a wire termination region of the inner signal contact 212, i.e., a region of the inner signal contact 212 where the inner signal contact 212 is connected to a conductor 221 of a cable 222 via resistance welding, laser welding or ultrasonic welding through a welding opening 226 (see FIG. 44).

The tube-like main section 219 defines a mating section having separable interconnection features and to this end includes a funnel-shaped end section 225 at one axial end of the tube-like main section 219. The funnel-shaped end section 225 may be configured as described herein. In particular, the tube-like main section 219 may be designed as a female contact spring, see FIG. 43. The tube-like main section 219 thus defines a mating section of the inner signal contact 212, i.e., a region of the inner signal contact 212 where a male signal contact or a male pin is guided into the female contact spring.

The tube-like main section 219 and the tube-like connection portion 218 extend at an angle to each other, in particular at a 90-degree angle. Thus, an orientation of the tube-like main section 219 and the tube-like connection portion 218 is angled, in particular perpendicular. It is to be understood that the angle between the orientation of the tube-like main section 219 and the orientation of the tube-like connection portion 218 may be any angle between 0 and 90 degrees.

Figure 44:
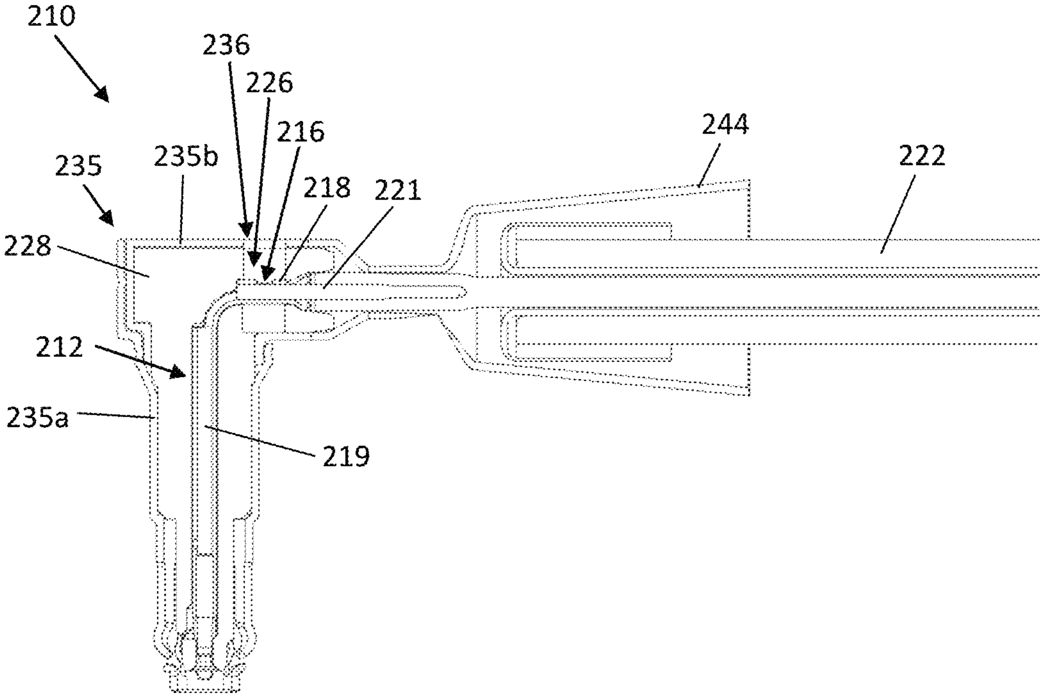
FIG. 44 is a cross-sectional view of a connector assembly comprising the inner signal contacts of FIG. 43 according to an embodiment.

According to another embodiment, the tube-like main section 219 and the tube-like connection portion 218 may extend parallel but offset to each other (not shown in FIG. 44). Alternatively, the tube-like main section 219 and the tube-like connection portion 218 may be coaxially aligned, as is shown, for example, in FIG. 25.

FIG. 44 shows a cross-sectional view of a connector assembly 210 comprising the inner signal contacts 212 of FIG. 43. When a cable 222 is fully inserted in a second connection end portion 244 of an outer shielding contact 235, a stripped end of a conductor 221 is positioned in the tube-like connection portion 218 such that the stripped end of the conductor 221 and the tube-like connection portion 218 can be accessed through aligned first, second and third welding openings 226, 227, 236 of the inner signal contact 212, an insulating element 228 and the outer shielding contact 235. Thereby, the conductor 221 can be connected to the inner signal contact 212 via laser welding through the first welding opening 226 of the inner signal contact 212, the second welding opening 227 of the insulating element 228 and the third welding opening 236 of the outer shielding contact 235. As a result of the welding, the first welding opening 226 of the inner signal contact 212, the second welding opening 227 of the insulating element 228 and the third welding opening 236 of the outer shielding contact 235 are closed by a weld spot.

The shape of the insulating element 228 is adapted to that of the inner signal contacts 212. That means that the insulating element 228 may include at least one elongated cavity to receive at least one inner signal contact 212. The cavity may be designed to generally formingly receive the tube-like main section 219 and the tube-like connection portion 218 of the inner signal contact 212, i.e. a cross-sectional dimension of a first part of the cavity is generally equal to the outer cross-sectional dimension of the tube-like main section 219 of the inner signal contact 212 and a cross-sectional dimension of a second part of the cavity is generally equal to the outer cross-sectional dimension of the tube-like connection portion 218 of the inner signal contact 212. An orientation of the first part of the cavity and an orientation of the second part of the cavity may be arranged at an angle to each other, in particular at a 90-degree angle, if the tube-like main section 219 and the tube-like connection portion 218 are arranged at an angle to each other.

Alternatively, the first part of the cavity and the second part of the cavity may be oriented parallel but offset to each other (not shown in FIG. 44) if the tube-like main section 219 and the tube-like connection portion 218 are oriented parallel but offset to each other. Furthermore, the first part of the cavity and the second part of the cavity may be aligned coaxially if the tube-like main section 219 and the tube-like connection portion 218 are coaxially aligned (see FIG. 25).

As shown in FIG. 44, the outer shielding contact 235 is also formed according to the inner signal contact 212. In particular, the outer shielding contact 235 may include a first part 235*a* and a second part 235*b*. An orientation of the first part 235*a* of the outer shielding contact 235 and an orientation of the second part 235*b* of the outer shielding contact 235 may be arranged at an angle to each other, in particular at a 90-degree angle, if the tube-like main section 219 and the tube-like connection portion 218 are aligned at an angle to each other.

Alternatively, the orientation of the first part 235*a* of the outer shielding contact 235 and the orientation of the second part 235*b* of the outer shielding contact 235 may be parallel but offset to each other (not shown in FIG. 44) if the tube-like main section 219 and the tube-like connection portion 218 extend parallel but offset to each other. Furthermore, the orientation of the first part 235*a* of the outer shielding contact 235 and the orientation of the second part 235*b* of the outer shielding contact 235 may be aligned coaxially if the tube-like main section 219 and the tube-like connection portion 218 are coaxially aligned (see FIG. 25).

While this invention has been described in terms of the preferred embodiments thereof, it is not intended to be so limited, but rather only to the extent set forth in the claims that follow. For example, the above-described embodiments (and/or aspects thereof) may be used in combination with each other. In addition, many modifications may be made to configure a particular situation or material to the teachings of the invention without departing from its scope. Dimensions, types of materials, orientations of the various components, and the number and positions of the various components described herein are intended to define parameters of certain embodiments and are by no means limiting and are merely prototypical embodiments.

Many other embodiments and modifications within the spirit and scope of the claims will be apparent to those of skill in the art upon reviewing the above description. The scope of the invention should, therefore, be determined with reference to the following claims, along with the full scope of equivalents to which such claims are entitled.

As used herein, 'one or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses all possible combinations of one or more of the associated listed items. It will be further understood that the terms "includes," "including," "includes," and/or "including," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context. Additionally, while terms of ordinance or orientation may be used herein these elements should not be limited by these terms. All terms of ordinance or orientation, unless stated otherwise, are used for purposes distinguishing one element from another, and do not denote any order of arrangement, order of operations, direction or orientation unless stated otherwise.

The invention claimed is:

1. A connector assembly, comprising:

at least one elongated inner signal contact which has a tube-like connection portion defining an axial direction and comprising a first welding opening; and an insulating element defining at least one elongated cavity designed to accommodate the at least one elongated inner signal contact, wherein the insulating element comprises at least one second welding opening which is aligned with the first welding opening in an assembled state of the connector assembly, wherein the insulating element comprises a first insulating element and a second insulating element, and wherein the first insulating element defines the at least one elongated cavity designed to accommodate the at least one elongated inner signal contact and the second insulating element comprises the at least one second welding opening.

2. The connector assembly according to claim 1, wherein the at least one elongated inner signal contact comprises a funnel-shaped reception section at one axial end of the tube-like connection portion.

3. The connector assembly according to claim 2, wherein the insulating element comprises at least one depression configured to receive the funnel-shaped reception section of the at least one elongated inner signal contact.

4. The connector assembly according to claim 2, wherein the insulating element has an end cap which comprises at least one funnel-shaped connection opening and wherein the at least one funnel-shaped connection opening and the funnel-shaped reception section are aligned in an assembled state of the connector assembly.

5. The connector assembly according to claim 1, further comprising an outer shielding contact having at least one third welding opening, wherein the first welding opening, the at least one second welding opening and the at least one third welding opening are aligned in an assembled state of the connector assembly.

6. The connector assembly according to claim 5, wherein the insulating element comprises at least one press fit spike configured to secure the insulating element to a first connection end portion of the outer shielding contact.

7. The connector assembly according to claim 6, wherein the outer shielding contact comprises at least one gap at the first connection end portion configured to receive the at least one press fit spike.

8. The connector assembly according to claim 5, wherein the outer shielding contact comprises at least one crimp wing configured to be bent over and cover the at least one third welding opening.

9. The connector assembly according to claim 5, wherein the outer shielding contact comprises a first outer shielding contact and a second outer shielding contact, the first outer shielding contact having the at least one third welding opening and the second outer shielding contact having at least one fourth welding opening and wherein the first welding opening, the at least one second welding opening, the at least one third welding opening and the at least one fourth welding opening are aligned in an assembled state of the connector assembly.

10. The connector assembly according to claim 1, wherein the insulating element completely surrounds the at least one elongated inner signal contact.

11. The connector assembly according to claim 1, wherein the at least one elongated inner signal contact further comprises a mating section having separable interconnection features and wherein the tube-like connection portion and the mating section extend at an angle, or parallel but offset, or coaxial to one another.

12. A method for assembling a connector assembly comprising at least one elongated inner signal contact which has a tube-like connection portion defining an axial direction and comprising a first welding opening; and an insulating element defining at least one elongated cavity designed to accommodate the at least one elongated inner signal contact, wherein the insulating element comprises at least one second welding opening which is aligned with the first welding opening in an assembled state of the connector assembly, wherein the insulating element comprises a first insulating element and a second insulating element, and wherein the first insulating element defines the at least one elongated cavity designed to accommodate the at least one elongated inner signal contact and the second insulating element comprises the at least one second welding opening, the method comprising:

placing the at least one elongated inner signal contact into a first insulating element of the insulating element such that the at least one elongated inner signal contact adopts a preliminary position;

sliding, in the axial direction, the at least one elongated inner signal contact along the first insulating element into an end position; and pinching a second insulating element of the insulating element onto the first insulating element of the insulating element such that the first welding opening and the at least one second welding opening are aligned in an assembled state of the connector assembly.

13. The method of claim 12, further comprising:

sliding a first connection end portion of an outer shielding contact onto the insulating element, the outer shielding contact having at least one third welding opening, wherein the first welding opening, the at least one second welding opening and the at least one third welding opening are aligned in an assembled state of the connector assembly.

14. The method of claim 13, further comprising:

inserting a cable into a second connection end portion of the outer shielding contact, wherein the cable comprises at least one conductor which is inserted into the tube-like connection portion of the at least one elongated inner signal contact; and crimping the second connection end portion of the outer shielding contact to the cable.

15. The method of claim 14, further comprising:

connecting the at least one conductor of the cable to the at least one elongated inner signal contact via welding through the first welding opening, the at least one second welding opening and the at least one third welding opening.

16. The method of claim 15, further comprising:

sliding a second outer shielding contact onto the first connection end portion of the outer shielding contact.

17. The method of claim 16, further comprising:

fixing the second outer shielding contact to the outer shielding contact via welding.

18. The method of claim 13, further comprising:

sliding a second outer shielding contact having at least one fourth welding opening onto the first connection end portion of the outer shielding contact;

inserting a cable into a second connection end portion of the outer shielding contact, wherein the cable comprises at least one conductor which is inserted into the tube-like connection portion of the at least one elongated inner signal contact; and crimping the second connection end portion of the outer shielding contact to the cable.

19. The method of claim 18, further comprising:

connecting the at least one conductor of the cable to the at least one elongated inner signal contact via welding through the first welding opening, the at least one second welding opening, the at least one third welding opening and the at least one fourth welding opening.

20. The method of claim 17, further comprising:

securing the crimped second connection end portion of the outer shielding contact via welding.

21. The method of claim 17, further comprising:

securing the crimped second connection end portion of the outer shielding contact via welding.

* * * * *